United States Patent
Yoda et al.

(10) Patent No.: US 10,769,004 B2
(45) Date of Patent: Sep. 8, 2020

(54) PROCESSOR CIRCUIT, INFORMATION PROCESSING APPARATUS, AND OPERATION METHOD OF PROCESSOR CIRCUIT

(71) Applicant: FUJITSU LIMITED, Kawasaki-shi, Kanagawa (JP)

(72) Inventors: Katsuhiro Yoda, Kodaira (JP); Mitsuru Tomono, Higashimurayama (JP); Takahiro Notsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 59 days.

(21) Appl. No.: 16/291,686

(22) Filed: Mar. 4, 2019

(65) Prior Publication Data
US 2019/0196887 A1  Jun. 27, 2019

Related U.S. Application Data

(63) Continuation of application No. PCT/JP2018/000987, filed on Jan. 16, 2018.

(30) Foreign Application Priority Data

Jan. 27, 2017  (JP) .................... 2017-013397

(51) Int. Cl.
*G06F 9/54* (2006.01)
*G06F 13/38* (2006.01)
(Continued)

(52) U.S. Cl.
CPC .......... *G06F 9/544* (2013.01); *G06F 9/38* (2013.01); *G06F 12/0802* (2013.01);
(Continued)

(58) Field of Classification Search
CPC ........ G06F 9/544; G06F 15/80; G06F 15/167; G06F 12/0842; G06F 12/0837;
(Continued)

(56) References Cited

U.S. PATENT DOCUMENTS 5,740,463 A   4/1998 Oshima et al.
2012/0311266 A1* 12/2012 Takata .............. G06F 12/0813
                                                    711/119
(Continued)

FOREIGN PATENT DOCUMENTS

JP  8-087475   4/1996
JP  8-147178   6/1996
(Continued)

OTHER PUBLICATIONS

Viebke et al, "The Potential of the Intel (R) Xeon Phi for Supervised Deep Learning", 2015 IEEE 17th International Conference on High Performance Computing and Communications Aug. 24-26, [retrieved on Jun. 16, 2020]. Retrieved from the Internet:< URL: https://ieeexplore.ieee.org/document/7336249> (Year: 2015).*

(Continued)

*Primary Examiner* — David Yi
*Assistant Examiner* — Dustin B. Fulford
(74) *Attorney, Agent, or Firm* — Fujitsu Patent Center

(57) ABSTRACT

A processor circuit includes: multiple processor cores; multiple individual memories; multiple shared memories; multiple memory control circuits; multiple selectors; and a control core; wherein when an address of the read request from the first processor associated with a specific memory control circuit is identical to the transfer source address, the specific memory control circuit controls the transfer data based on the read request to be transferred to the transfer destination address via a specific selector of the multiple selectors in which the transfer selection information is set, wherein, when the control core sets read selection information in each of the multiple selectors, read data is read by one of the first processor core and the first adjacent processor core from the associated shared memory via a specific
(Continued)

selector of the multiple selectors in which the read selection information is set.

10 Claims, 17 Drawing Sheets

(51) Int. Cl.
*G06F 15/80* (2006.01)
*G06F 15/16* (2006.01)
*G06T 1/60* (2006.01)
*G06N 3/02* (2006.01)
*G06F 12/0802* (2016.01)
*G06N 3/10* (2006.01)
*G06F 9/38* (2018.01)

(52) U.S. Cl.
CPC ............... *G06F 13/38* (2013.01); *G06F 15/16* (2013.01); *G06F 15/80* (2013.01); *G06N 3/10* (2013.01); *G06T 1/60* (2013.01); *G06N 3/02* (2013.01)

(58) Field of Classification Search
CPC ........ G06F 12/0802; G06F 13/38; G06F 9/38; G06F 15/16; G06N 3/063; G06N 3/0454; G06N 3/08; G06N 3/02; G06N 3/10; G06T 1/60

USPC ........................................................ 711/147
See application file for complete search history.

(56) References Cited

U.S. PATENT DOCUMENTS

2013/0104137 A1   4/2013   Fukuzaki et al.
2014/0013021 A1   1/2014   Matsumoto et al.

FOREIGN PATENT DOCUMENTS

| | | |
|---|---|---|
| JP | 11-184841 | 7/1999 |
| JP | 11-185033 | 7/1999 |
| JP | 2013-156783 | 8/2013 |
| WO | 2012/001835 | 1/2012 |
| WO | 2016/075813 | 5/2016 |

OTHER PUBLICATIONS

International Search Report, mailed in connection with PCT/JP2018/000987, and dated Feb. 27, 2018, with partial English Translation (3 pages).

\* cited by examiner

FIG. 8

| TIME | T0 | T1 | T2 | T3 | T4 |
|---|---|---|---|---|---|
| CORE0 | | ΣW0*X0 | ΣW3*X3 | ΣW2*X2 | ΣW1*X1 |
| IMEM0 | X0 | | | | |
| | F00-F03(W0-W3) | | | | |
| CMEM_B0a | | ΣW*X | | | X0 |
| CMEM_B0b | | | X3 | X2 | X1 |
| CORE1 | | ΣW1*X1 | ΣW0*X0 | ΣW3*X3 | ΣW2*X2 |
| IMEM1 | X1 | | | | |
| | F10-F13(W0-W3) | | | | |
| CMEM_B1a | | ΣW*X | | | X1 |
| CMEM_B1b | | | X0 | X3 | X2 |
| CORE2 | | ΣW2*X2 | ΣW1*X1 | ΣW0*X0 | ΣW3*X3 |
| IMEM2 | X2 | | | | |
| | F20-F23(W0-W3) | | | | |
| CMEM_B2a | | ΣW*X | | | X2 |
| CMEM_B2b | | | X1 | X0 | X3 |
| CORE3 | | ΣW3*X3 | ΣW2*X2 | ΣW1*X1 | ΣW0*X0 |
| IMEM3 | X3 | | | | |
| | F30-F33(W0-W3) | | | | |
| CMEM_B3a | | ΣW*X | | | X3 |
| CMEM_B3b | | | X2 | X1 | X0 |

PROCESSOR CIRCUIT, INFORMATION PROCESSING APPARATUS, AND OPERATION METHOD OF PROCESSOR CIRCUIT

CROSS-REFERENCE TO RELATED APPLICATION

This application is a continuation application of International Application PCT/JP2018/000987 filed on Jan. 16, 2018 and designated the U.S., the entire contents of which are incorporated herein by reference. The International Application PCT/JP2018/000987 is based upon and claims the benefit of priority of the prior Japanese Patent Application No. 2017-013397, filed on Jan. 27, 2017, the entire contents of which are incorporated herein by reference.

FIELD

The embodiments discussed herein are related to a processor circuit, an information processing apparatus, and an operation method of the processor circuit.

BACKGROUND

Deep learning (hereinafter referred to as DL) is performed by a processor circuit in an information processing apparatus performing arithmetic processing. Algorithms that use a neural network (hereinafter referred to as a deep neural network (DNN)) having multiple layers are collectively referred to as DL. Among various types of DNNs, convolution neural networks (CNNs) are employed in many cases. The CNNs are widely used as DNNs for, for example, determining features in images.

With use of a CNN for determining features in images, a convolution operation is performed for an input image by using filters, and features in the image (for example, edge features) are detected. The convolution operation of the CNN is performed by, for example, a processor circuit. Japanese Laid-open Patent Publication No. 2013-156783 discloses inter-processor communications in a multi-core processor system.

Examples of the related art include International Publication Pamphlet Nos. WO2016/075813 and WO2012/001835, and Japanese Laid-open Patent Publication No. 08-147178.

SUMMARY

According to an aspect of the embodiments, a processor circuit includes: (a) multiple processor cores; (b) multiple individual memories, each of the multiple individual memories being associated with one of the multiple processor cores and being configured to be accessed from the associated one of the multiple processor cores; (c) multiple shared memories, each of the multiple shared memories being associated with a first processor core, the first processor core being any one of the multiple processor cores, each of the multiple shared memories being configured to be accessed from either the first processor core or a first adjacent processor core, the first adjacent processor core being one of the multiple processor cores and being adjacent to the first processor core in a first direction among the multiple processor cores; (d) multiple memory control circuits, each of the multiple memory control circuits being provided between the first processor core and an associated individual memory of the multiple individual memories and being configured to output a read request from the first processor core to the associated individual memory belonging to the first processor core; (e) multiple selectors, each of the multiple selectors being associated with one of the multiple shared memories and being configured to select a read request from one of the first processor core, to which the associated one of the multiple shared memories belong, and the first adjacent processor core, output the selected read request to the associated one of the multiple shared memories, select a transfer request from one of a specific memory control circuit of the multiple memory control circuits and another memory control circuit of the multiple memory circuits belonging to a second adjacent processor core adjacent to the specific memory control circuit in a second direction, and output the selected transfer request to the associated one of the multiple shared memories; and (f) a control core configured to control the multiple processor cores; (g) wherein, in a case where the control core sets, in each of the multiple memory control circuits, a transfer source address of one of the multiple individual memories and the multiple shared memories that store transfer data to be transferred among the multiple processor cores and a transfer destination address of one of the multiple shared memories to which the transfer data is to be transferred and also sets transfer selection information in each of the multiple selectors, (h) with respect to each of the multiple memory control circuits, when an address of the read request from the first processor, to which a specific memory control circuit belongs, is identical to the transfer source address, the specific memory control circuit controls the transfer data in accordance with the read request to be transferred to the transfer destination address via a specific selector of the multiple selectors in which the transfer selection information is set, (i) wherein, in a case where the control core sets read selection information in each of the multiple selectors, with respect to each of the multiple shared memories, read data is read by one of the first processor core, to which an associated shared memory of the multiple shared memories belongs, and the first adjacent processor core from the associated shared memory via a specific selector of the multiple selectors in which the read selection information is set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a sequence chart illustrating an outline of reading operation and convolution operation for images that are performed by four processor cores illustrated in FIG. 7;

DESCRIPTION OF EMBODIMENTS

The aforementioned convolution operation is such that, while the location of a coefficient filter in an image is moved in a raster scan direction of the image, sum-of-product operations are repeated by using values of pixel data of an adjacency matrix centered at a target pixel of the image and coefficients (weights) of the coefficient filter. The convolution operation involves operations performed by using multiple images and multiple coefficient filters, and thus, performing the convolution operations in parallel by using multiple sum-of-product operation units contributes to the reduction in operation time. In such a case, multiple cores having respective operation units individually read multiple images from memory and repeat sum-of-product operations by using respective coefficient filters.

The processing performed by multiple cores to read multiple identical images from memory is a factor in the reduction in processing efficiency of the convolution operation. Worse still, since the operations in a DNN involve a multitude of convolution operations, the degree of the reduction in processing efficiency due to reading processing increases in proportion.

One object of an embodiment is to provide a processor circuit, an information processing apparatus, and an operation method of the processor circuit that contribute efficient image reading processing performed by cores in the processor circuit.

Figure 1:
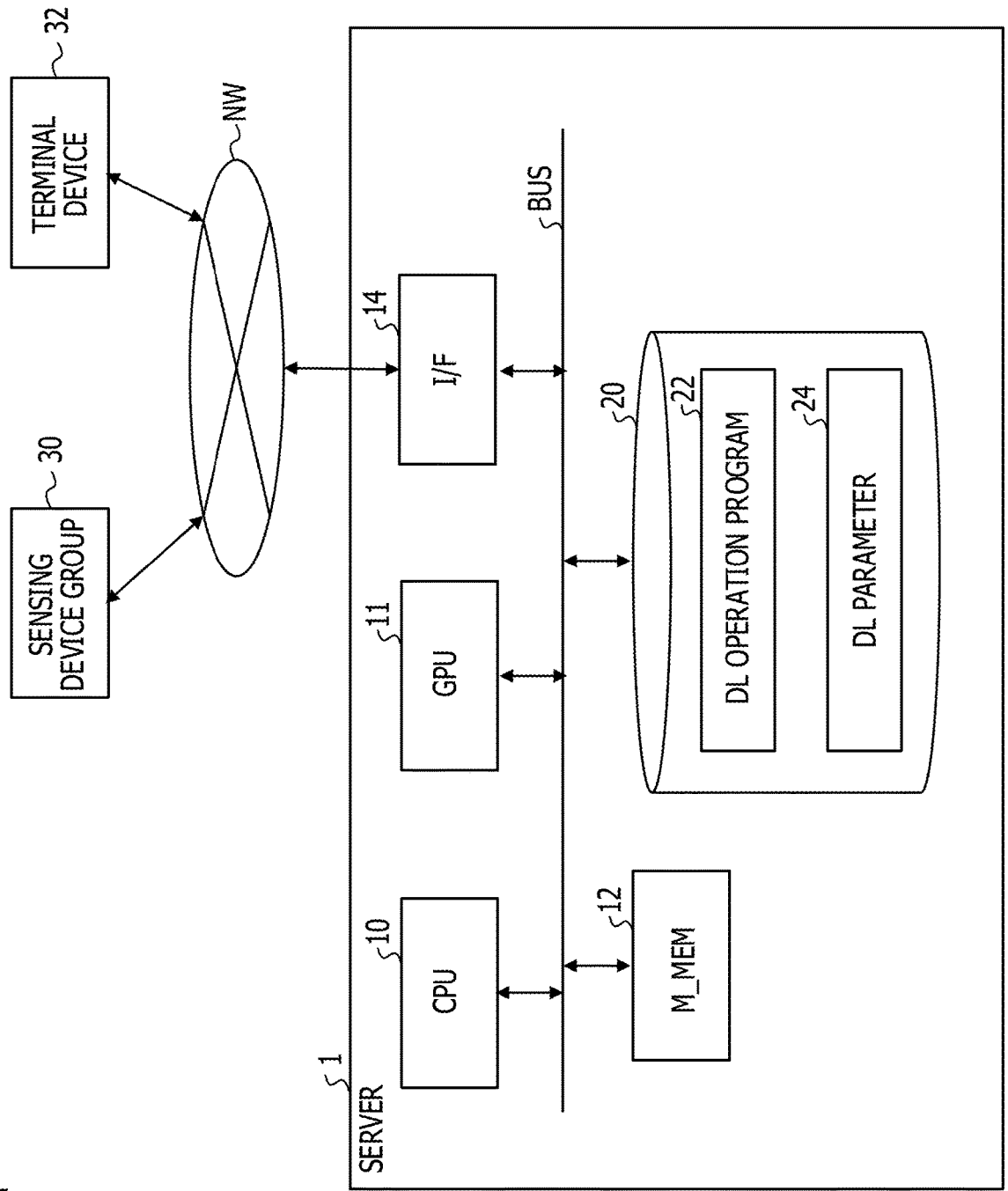
FIG. 1 illustrates a configuration of an information processing apparatus (a deep learning server) according to an embodiment.

FIG. 1 illustrates a configuration of an information processing apparatus (a deep learning server) according to the present embodiment. A server 1 is capable of communicating with a sensing device group 30 and a terminal device 32 via a network. The sensing device group 30, for example, captures an image by using an imaging element, generates image data, and transmits the image data to the server 1. The terminal device 32 receives a determination result of features in the image from the server 1 and outputs the determination result.

The server 1 includes a central processing unit (CPU) 10, which is a general processor circuit, and a GPU 11, which is a graphics processor circuit. The server 1 also includes a main memory 12 such as a dynamic random-access memory (DRAM), a network interface 14 such as a network interface card (NIC), and a large-capacity auxiliary storage device 20 such as a hard disk or a solid state drive (SSD), and a bus BUS that connects these devices to one another.

The auxiliary storage device 20 stores, for example, a DL operation program 22 and a DL parameter 24. The auxiliary storage device 20 stores, in addition to the aforementioned program and the parameters, an operating system (OS) and various kinds of middleware programs, which are not illustrated in the diagram. The CPU 10 and the GPU 11 load the program and the parameters into the main memory 12 and execute the program in accordance with the parameters.

Figure 2:
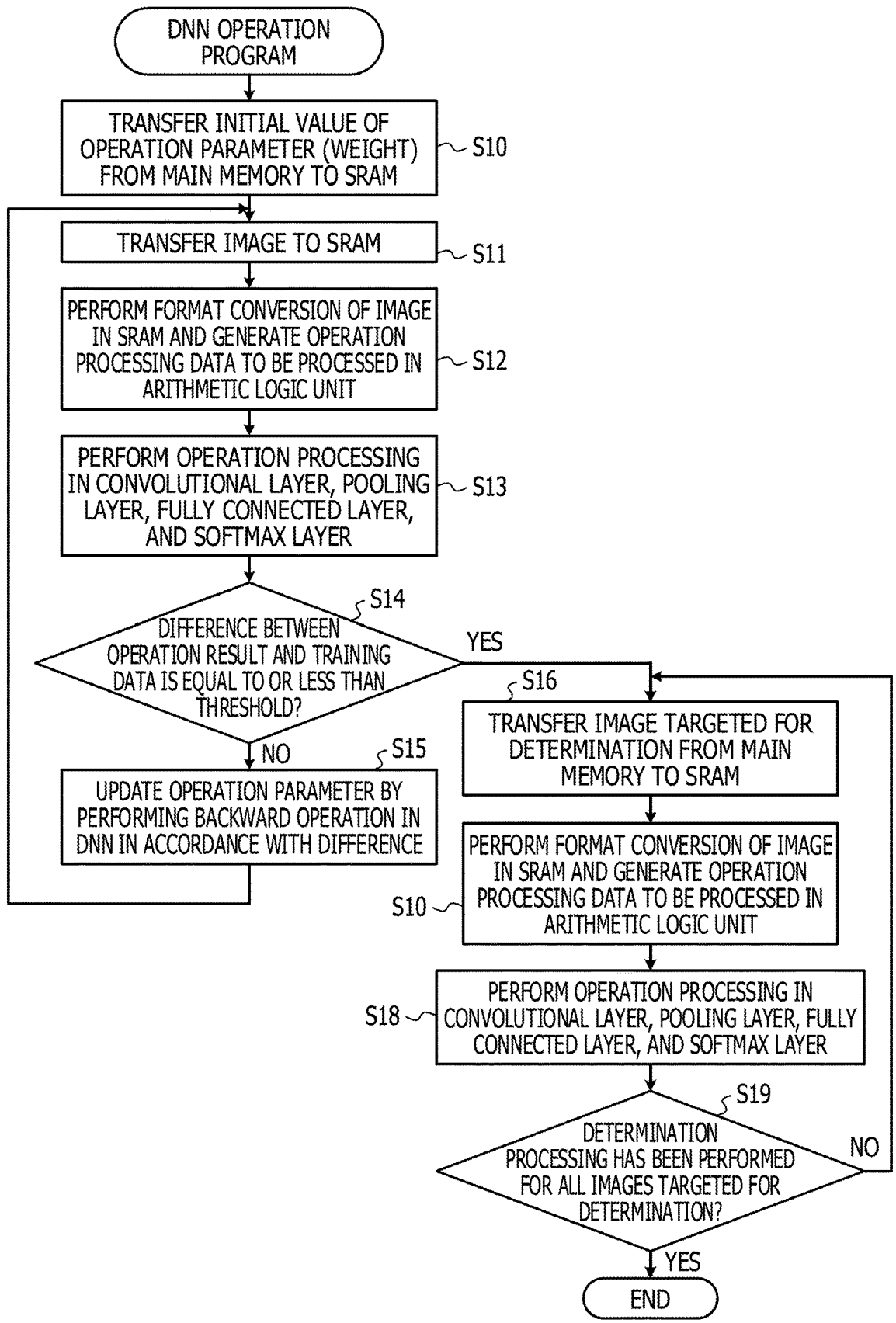
FIG. 2 is a flowchart illustrating an outline of processing of a DL operation program.

FIG. 2 is a flowchart illustrating an outline of processing of the DL operation program 22. The DL operation program 22 performs, for example, a DNN operation. The CPU 10 and the GPU 11 execute the DL operation program 22 and perform processing in a learning mode and a determination mode. An example of DL is described by using a DNN for determining features in an image.

In the learning mode, the CPU 10 and the GPU 11 read an initial value of an operation parameter (for example, a filter coefficient (weight)) from the main memory 12 and write the initial value of the operation parameter to a high-speed memory SRAM in the GPU 11 (S10). The CPU 10 and the GPU 11 also read from the main memory 12 an image transmitted from the sensing device group 30 and write the image to the high-speed memory SRAM (S11). The CPU 10 and the GPU 11 subsequently perform format conversion of the image and generate an adjacency-matrix image (operation processing data) to be input to an arithmetic logic unit (S12) and perform operation processing in a convolutional layer, a pooling layer, a fully connected layer, and a softmax layer (an output layer) of a DNN (S13). The operation is performed individually for a predetermined number of images. The operation result is expressed, for example, such that a specific image corresponds to either a 0 or a 1.

The CPU 10 and the GPU 11 determine whether the difference between the operation result and training data as correct image data is equal to or less than a threshold (S14), and in a case where the difference is more than the threshold (NO in S14), update the operation parameter by performing a backward operation in the DNN in accordance with the difference (S15). Subsequently, by using the updated operation parameter, steps S11 to S13 are repeated. Here, the difference between the operation result and the training data is, for example, the sum of differences between 1000 operation results, which are obtained by performing operations for 1000 images, and 1000 kinds of training data.

If the above-described difference is equal to or less than the threshold (YES in S14), it is determined that the operation parameter is set to an optimum value and the learning mode is ended. By using the optimum value of the operation parameter, the following operation processing in the determination mode is performed.

In the determination mode, the CPU 10 and the GPU 11 read the image targeted for determination from the main memory 12 (S16), perform format conversion of the image and generate an adjacency-matrix image to be input to an arithmetic logic unit (S17), and performs operation processing in the convolutional layer, the pooling layer, the fully connected layer, and the softmax layer of the DNN (S18). The CPU 10 and the GPU 11 repeat the determination processing until the determination processing has been performed for all images targeted for determination (S19). The determination result is transmitted and output to the terminal device 32.

Figure 3:
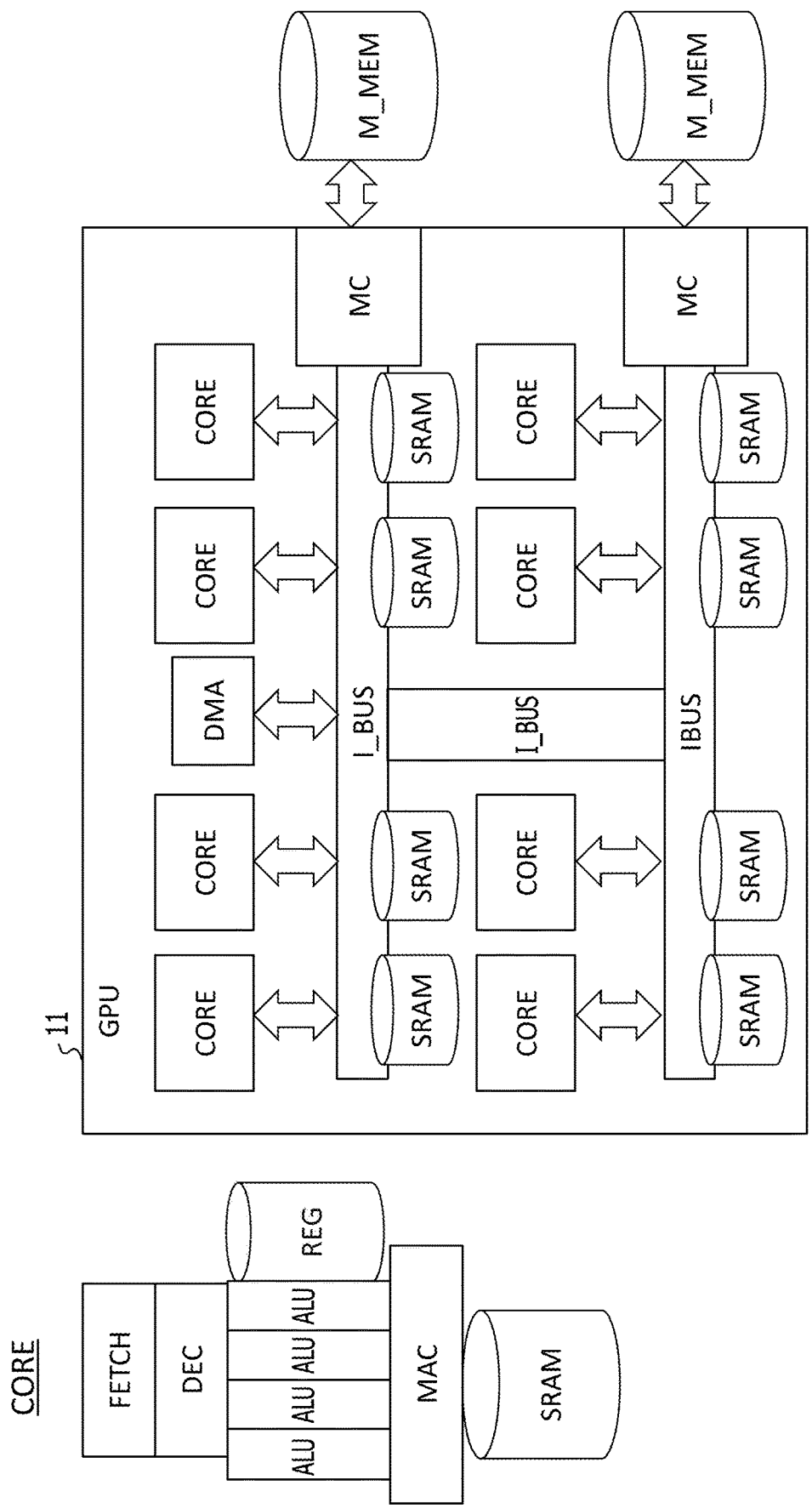
FIG. 3 illustrates a configuration of a graphic processing unit (GPU) and a configuration of a processor core in the GPU.

FIG. 3 illustrates a configuration of the GPU 11 and a configuration of a processor core CORE in the GPU 11. The GPU 11 is accessible to main memories M_MEM. The GPU 11 includes, for example, eight processor cores CORE, multiple high-speed memories SRAM, which are disposed in association with the respective processor cores CORE, an internal bus I_BUS, and memory controllers MC, which perform access control for main memories M_MEM. The GPU 11 also includes L1 cache memories in the respective processor cores CORE, an L2 cache memory shared among the eight processor cores CORE, and various kinds of peripheral resource circuits, which are all not illustrated in FIG. 3. The GPU 11 also includes a direct memory access control circuit DMA for controlling, for example, internal data transfer among the high-speed memories SRAM and data transfer among the main memories M_MEM and the high-speed memories SRAM.

The processor core CORE includes, similarly to a general processor core, an instruction fetch circuit FETCH that retrieves an instruction from a memory, a decoder DEC that decodes the retrieved instruction, multiple arithmetic logic units ALU that perform arithmetic operations for the instruction in accordance with the decoding result, a register group REG for the multiple arithmetic logic units ALU, and a memory access control circuit MAC for accessing the high-speed memory SRAM.

The GPU 11 is implemented as, for example, a semiconductor chip and is a DL apparatus of the present embodiment. The GPU 11 reads an image from the main memories M_MEM storing the image transmitted from the sensing device group 30 and writes the image to the high-speed memories SRAM. The image written to the high-speed memories SRAM is input to the arithmetic logic units ALU in the processor cores CORE. The arithmetic logic units ALU perform operation processing in each layer in the DNN and generate an output of the DNN.

Figure 4:
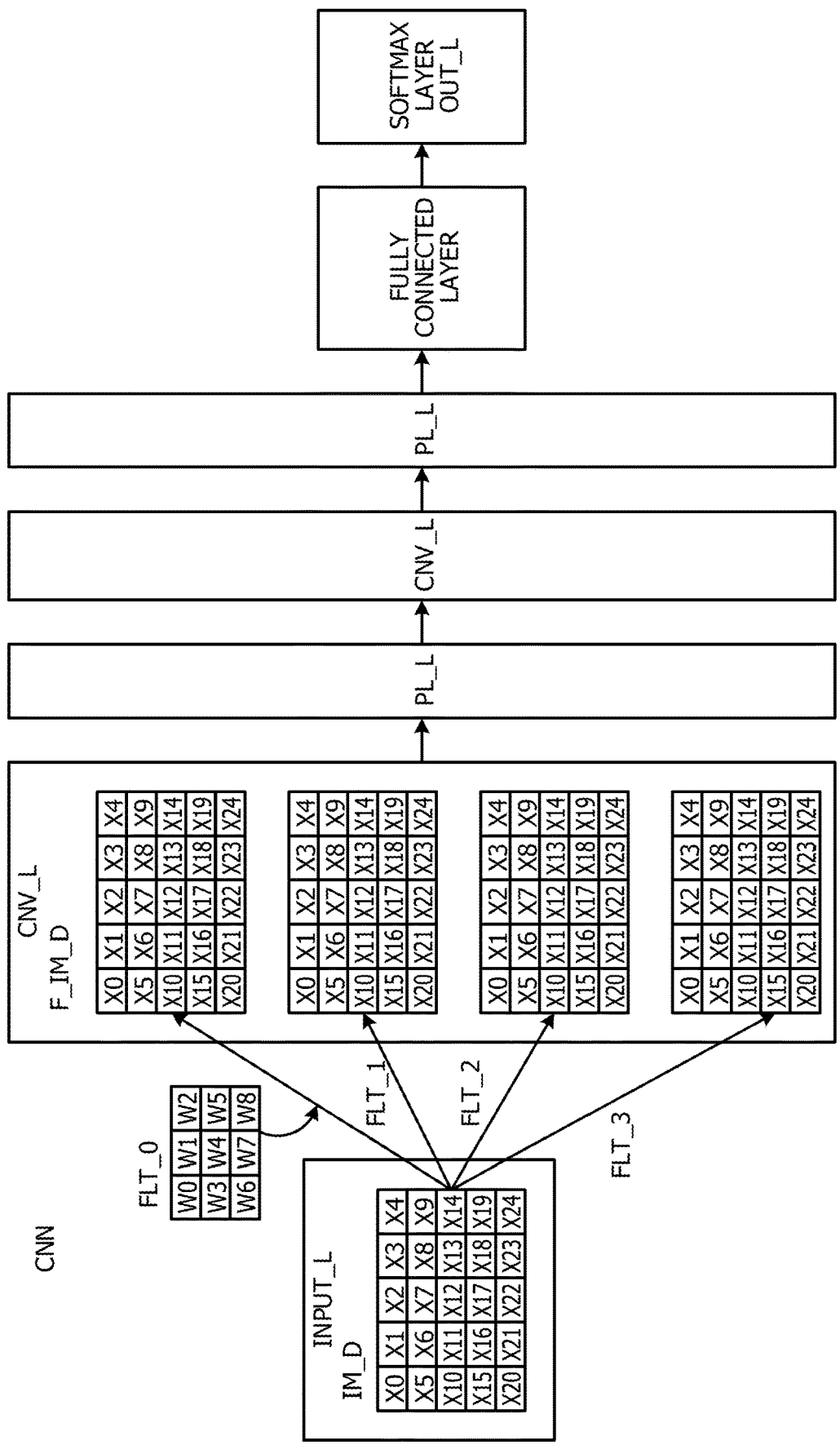
FIG. 4 illustrates an example of a CNN.

FIG. 4 illustrates an example of a CNN. The CNN for performing determination processing of an image has an input layer INPUT_L to which an image IM_D is input as input data, multiple pairs each including a convolutional layer CNV_L and a pooling layer PL_L, a fully connected layer C_L, and an output layer (a softmax layer) OUT_L.

The convolutional layer CNV_L generates an image F_IM_D having a specific feature obtained by filtering the image IM_D by using a coefficient filter FLT. By performing filtering with multiple coefficient filters FLT_0 to FLT_3, multiple images F_IM_D having respective features are generated. The pooling layer PL_L, for example, selects a representative value (for example, a maximum value) in each node in the convolutional layer CNV_L. In the output layer OUT_L, for example, a determination result expressed by numbers (any of 0 to 9) in the image is output as described above.

In the convolutional layer CNV_L, sum-of-product operations are performed such that values of pixel data of, for example, a 3×3 adjacency matrix in the image IM_D composed of pixels of an M×N two-dimensional pixel matrix and values of coefficient data of a coefficient filter FLT having the same 3×3 structure as that of the adjacency matrix are respectively multiplied and the multiplication results are added together, and accordingly, a patch of the image F_IM_D of the adjacency matrix centered at a target pixel is generated. This filtering processing is performed for pixels of the entire image IM_D while the coefficient filter FLT is moved in a raster scan direction of the image IM_D. Such processing constitutes the convolution operation.

Figure 5:
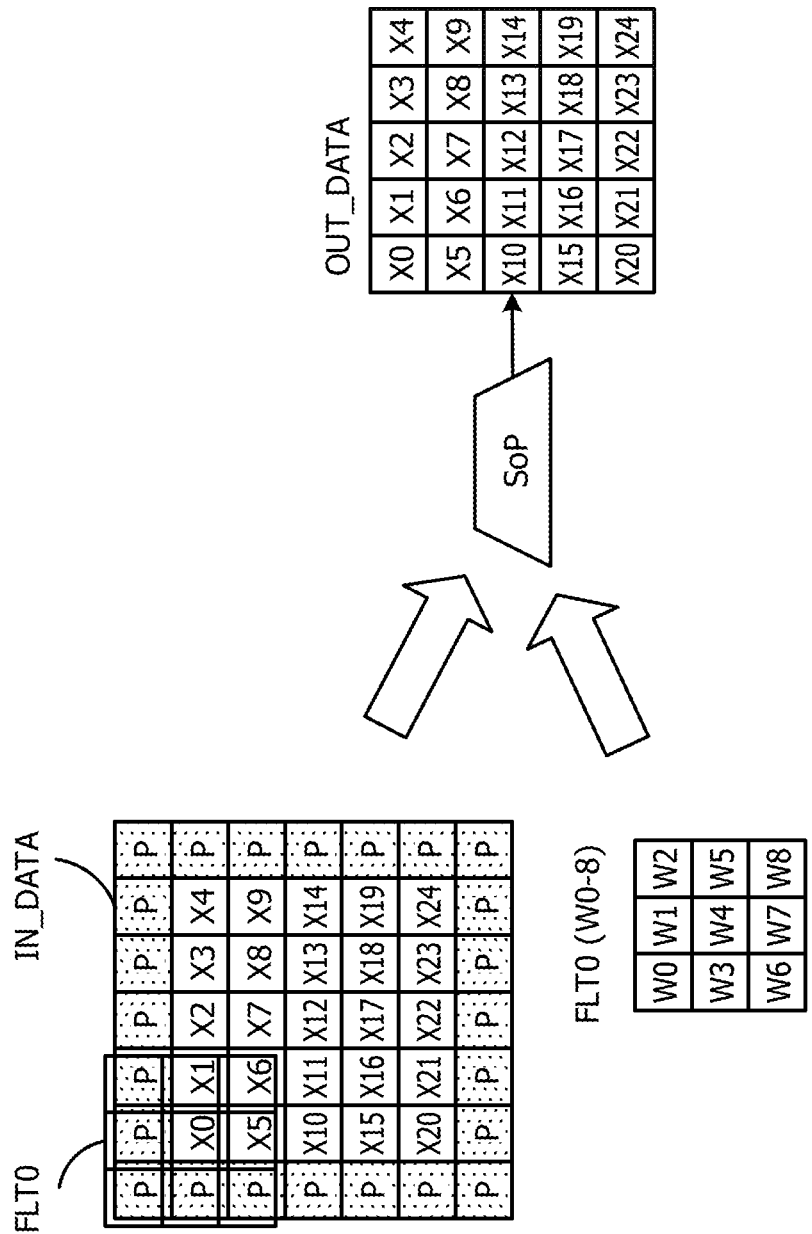
FIG. 5 is a diagram for describing convolution operation.

FIG. 5 is a diagram for describing the convolution operation. FIG. 5 illustrates as an example an input image IN_DATA formed by adding a padding P around a 5×5 image, a coefficient filter FLT0 having weights W0 to W8 in a 3×3 matrix, an output image OUT_DATA obtained by performing the convolution operation. The convolution operation is such that values of multiple pixels in an adjacency matrix centered at a target pixel and the multiple coefficients (weights) W0 to W8 of the coefficient filter FLT0 are respectively multiplied and the multiplication results are added together while the coefficient filter FLT0 is moved in a raster scan direction of the image.

When a value of a pixel in an adjacency matrix is Xi (where i=0 to 8) and a coefficient of a coefficient filter is Wi (where i=0 to 8), a sum-of-product operation equation is as follows:

$$Xi = \Sigma(Xi * Wi) \quad (1)$$

where Xi on the right-hand side is a value of a pixel of the input image IN_DATA, Wi is a coefficient, Σ denotes the sum when i=0 to 8, and Xi on the left-hand side is a sum-of-product operation value, that is, a value of a pixel of the output image OUT_DATA.

In a case where the target pixel of the image is X6, the value of the pixel X6 obtained by performing sum-of-product operation in accordance with Equation (1) is as follows:

$$X6 = X0*W0 + X1*W1 + X2*W2 + X5*W3 + X6*W4 + X7*W5 + X10*W6 + X11*W7 + X12*W8.$$

Embodiment

Figure 6:
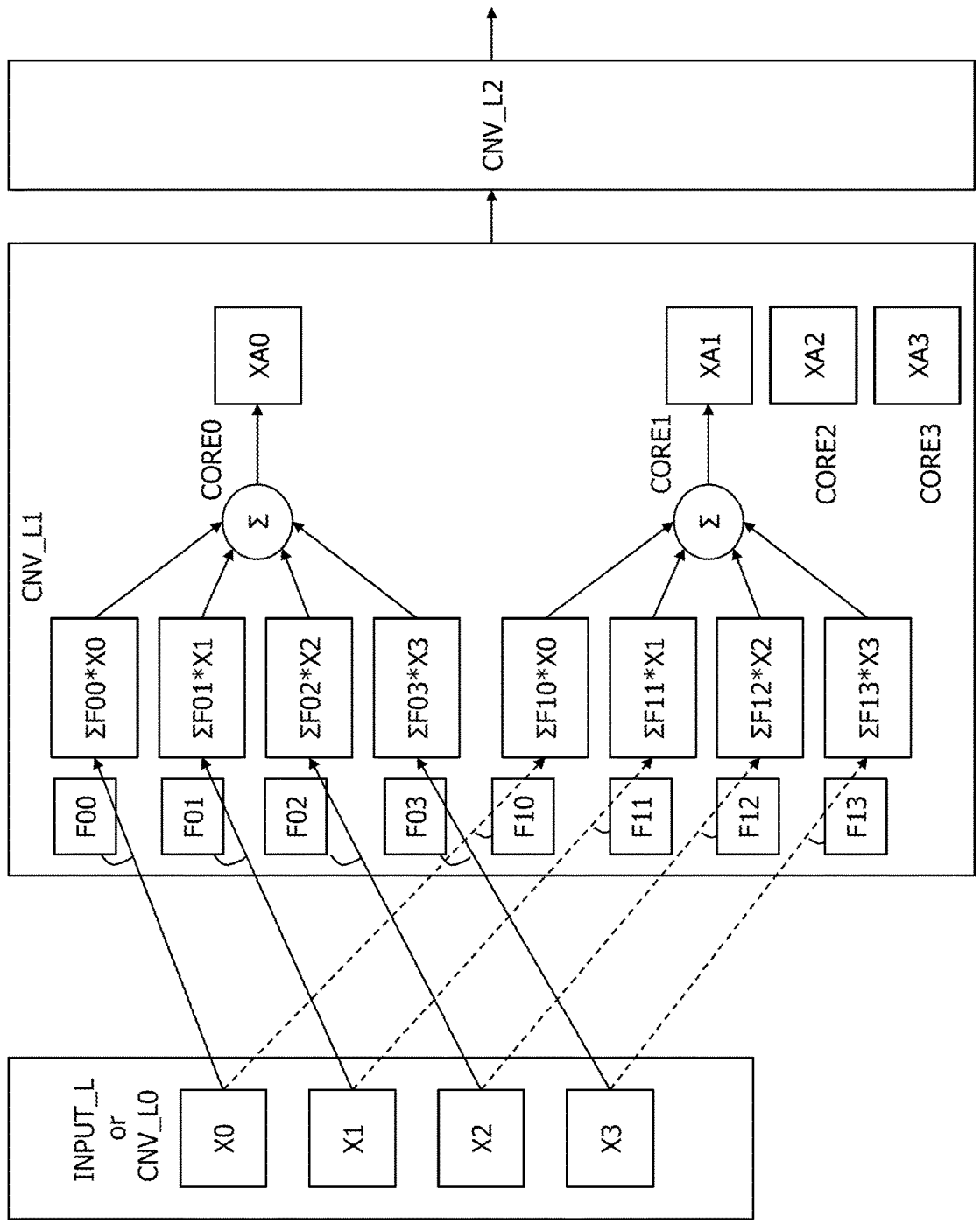
FIG. 6 illustrates an example of convolution operation of a DL apparatus of the embodiment.

FIG. 6 illustrates an example of convolution operation of the DL apparatus of the present embodiment. FIG. 6 illustrates an input layer INPUT_L and multiple convolutional layers CNV_L and omits the pooling layers between the convolutional layers. The input layer INPUT_L may be a convolutional layer CNV_L0. Successively, two convolutional layers CNV_L1 and CNV_L2 are provided.

Multiple images X0 to X3 are input to or generated in the input layer INPUT_L or the convolutional layer CNV_L0 as the first layer. The images X0 to X3 in FIG. 6 each have pixels in an N×M matrix similarly to the image IM_D in FIG. 4. Accordingly, although pixels X0 to X24 of the image IM_D in FIG. 4 and the images X0 to X3 in FIG. 6 use identical reference characters, the same reference characters denote a pixel in FIG. 4 and an image in FIG. 6 and the subsequent drawings.

In the convolutional layer CNV_L1 as the second layer, four kinds of convolution operations are performed as follows:

(1) with respect to the four images X0 to X3 in the first layer, the convolution operations are performed by using respective coefficient filters F00 to F03 of a first coefficient filter group, images ΣF00*X0 to ΣF03*X3 are accordingly generated, and an image XA0 as an operation result is generated by adding the images ΣF00*X0 to ΣF03*X3 together;

(2) with respect to the four images X0 to X3 in the first layer, the convolution operations are performed by using respective coefficient filters F10 to F13 of a second coefficient filter group, images ΣF10*X0 to ΣF13*X3 are accordingly generated, and an image XA1 as an operation result is generated by adding the images ΣF10*X0 to ΣF13*X3 together;

(3) similarly to the above, with respect to the four images X0 to X3 in the first layer, the convolution operations are performed by using respective coefficient filters F20 to F23 of a third coefficient filter group, and an image XA2 as an operation result is generated by adding together images generated by performing the convolution operations; and (4) similarly to the above, with respect to the four images X0 to X3 in the first layer, the convolution operations are performed by using respective coefficient filters F30 to F33 of a fourth coefficient filter group, and an image XA3 as an operation result is generated by adding together images generated by performing the convolution operations.

In the above example of the convolution operations in the convolutional layer, the convolution operations are performed for the four images X0 to X3 by using the four respective coefficient filter groups. To increase the efficiency of many convolution operations, it is preferable that the (1) to (4) convolution operations described above be performed in parallel by using four processor cores CORE0 to CORE3. In such a case, the four processor cores CORE0 to CORE3 each read the four images X0 to X3 from a memory.

GPU Configuration

Figure 7:
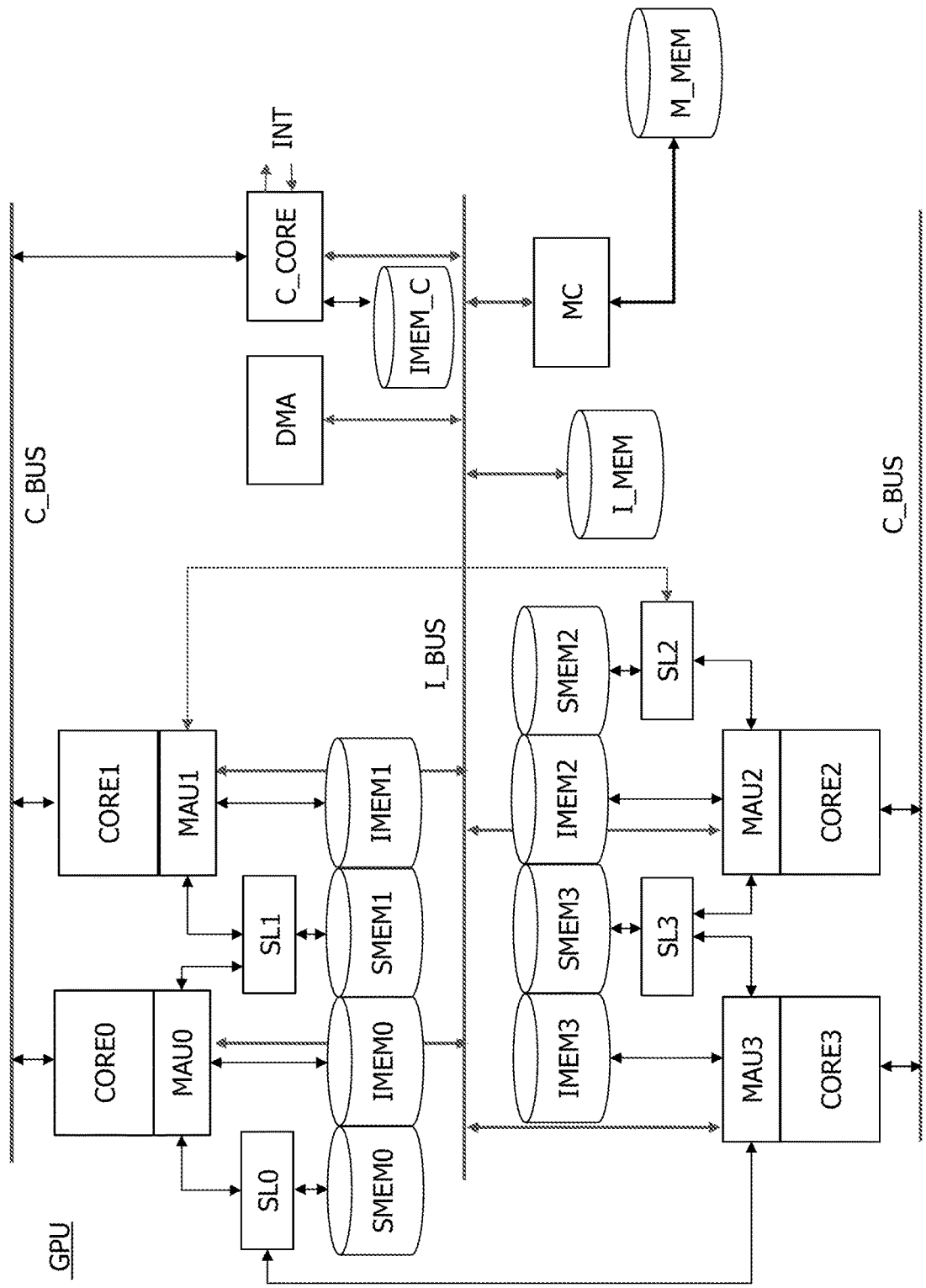
FIG. 7 illustrates a configuration of a graphic processor circuit of the embodiment.

FIG. 7 illustrates a configuration of a graphic processor circuit GPU of the present embodiment. The graphic processor circuit GPU is a deep learning apparatus for performing deep learning operation.

The graphic processor circuit GPU illustrated in FIG. 7 includes four processor cores CORE0 to CORE3 and a control core C_CORE for controlling the processor cores CORE0 to CORE3, and in addition, similarly to the configuration illustrated in FIG. 3, a direct memory access control circuit DMA, a memory controller MC, an internal high-speed memory (SRAM) I_MEM, and an internal bus I_BUS.

The graphic processor circuit GPU also includes multiple individual memories IMEM0 to IMEM3 associated with the respective processor cores CORE0 to CORE3 and accessed from the processor cores CORE0 to CORE3 to which the multiple individual memories IMEM0 to IMEM3 belong individually. The graphic processor circuit GPU also includes multiple shared memories SMEM0 to SMEM3 associated with the respective processor cores CORE0 to CORE3. The multiple shared memories SMEM0 to SMEM3 are each accessed from a processor core to which the specific shared memory belongs and a first adjacent processor core adjacent in a first direction to the processor core to which the specific shared memory belongs. For example, the shared memory SMEM0, which belongs to the processor core CORE0, is accessed from the processor core CORE0 and the processor core CORE3 as the first adjacent processor core.

The graphic processor circuit GPU also includes multiple memory control circuits MAU0 to MAU3 each provided between the respective processor cores CORE0 to CORE3 and the respective individual memories IMEM0 to IMEM3. The multiple memory control circuits MAU0 to MAU3 each output a read request from a specific processor core to an individual memory belonging to the specific processor core.

The graphic processor circuit GPU also includes multiple selectors SL0 to SL3 associated with the respective shared memories SMEM0 to SMEM3. Each of the multiple selectors SL0-SL3 (for example, the selector SL0) selects one of a read request from a processor core (for example, the processor core CORE0) to which a specific shared memory belongs and a read request from the first adjacent processor core (the processor core CORE3) described above and outputs the selected read request to the specific shared memory (the shared memory SMEM0). Each of the multiple selectors SL0-SL3 (for example, the selector SL0) also selects one of a transfer request from a memory control circuit (the memory control circuit MAU0) and a transfer request from another memory control circuit (the memory control circuit MAU1) belonging to a second adjacent processor core (the processor core CORE1) adjacent in a second direction to the processor core (the processor core CORE0) and outputs the selected transfer request to the specific shared memory (the shared memory SMEM0).

The individual memories IMEM0 to IMEM3 and the shared memories SMEM0 to SMEM3 are all high-speed static random-access memories (SRAM) and accessed from the processor cores CORE0 to CORE3. Furthermore, for example, contiguous address areas in a memory space are allocated to the individual memories IMEM0 to IMEM3 and the shared memories SMEM0 to SMEM3 as described later. As a result, the processor cores CORE0 to CORE3 are each able to perform an access request for any of its individual memory, its shared memory, and another shared memory belonging to its second adjacent processor core by specifying the address of a specific memory to be accessed.

When the graphic processor circuit GPU performs the convolution operation in the convolutional layer CNV_L1 illustrated in FIG. 6, the four processor cores CORE0 to CORE3 in the graphic processor circuit GPU perform in parallel the convolution operations for the four images X0 to X3 by each using four filters that are assigned to the specific processor core of the respective processor cores. In this case, as described above, the four processor cores CORE0 to CORE3 all sequentially read the four images X0 to X3 and repeat the convolution operations by using their filters. At this time, by transferring the images X0 to X3 between adjacent processor cores via a shared memory associated with each processor core, the number of steps performed by the four processor cores CORE0 to CORE3 to read the four images X0 to X3 is reduced.

Convolution Operation Performed by GPU

By using the convolution operation illustrated in FIG. 6 as an example, there is described an outline of reading operation and convolution operation for the images X0 to X3 that are performed by the four processor cores CORE0 to CORE3 illustrated in FIG. 7.

FIG. 8 is a sequence chart illustrating an outline of reading operation and convolution operation for the images X0 to X3 that are performed by the four processor cores CORE0 to CORE3 illustrated in FIG. 7. A time axis TIME is indicated in the horizontal direction and the four processor cores CORE0 to CORE3, the individual memories IMEM0 to IMEM3, the shared memories SMEM0 to SMEM3 are indicated in the vertical direction. With respect to each of times T0 to T4, details of operation are indicated for each of the processor cores CORE0 to CORE3 and stored data is indicated for each of the individual memories IMEM0 to IMEM3, and the shared memory CMEM. The shared memories SMEM0 to SMEM3 each have two of memory banks B0a, B0b to B3a, and B3b. The memory bank is an individual memory unit for which an access request (a read request or a write request) is input and that is accessed accordingly.

The direct memory access control circuit DMA controls in advance the four images X0 to X3 and the four coefficient filter groups in the external main memory M_MEM to be transferred to the internal high-speed memory I_MEM. In the time T0, the direct memory access control circuit DMA controls the four images X0 to X3 and the four coefficient filter groups of the coefficient filters F00 to F03, F10 to F13, F20 to F23, and F30 to F33 in the external main memory M_MEM to be transferred to the four respective individual memories IMEM0 to IMEM3. For example, the image X0 and the coefficient filters F00 to F03 of the first coefficient filter group are transferred to the individual memory IMEM0, the image X1 and the coefficient filters F10 to F13 of the second coefficient filter group to the individual memory IMEM1, the image X2 and the coefficient filters F20 to F23 of the third coefficient filter group to the individual memory IMEM2, the image X3 and the coefficient filters F30 to F33 of the fourth coefficient filter group to the individual memory IMEM3. In the following description, coefficients of four coefficient filters in each group are denoted by W0 to W3.

In the time T1 as a first operation cycle, the processor cores CORE0 to CORE3 read the respective images X0 to X3 and the respective coefficient filters F00 to F03, F10 to F13, F20 to F23, and F30 to F33 from the respective individual memories IMEM0 to IMEM3, which belong respectively to the processor cores CORE0 to CORE3, and perform respective convolution operations $\Sigma W0*X0$, $\Sigma W1*X1$, $\Sigma W2*X2$, and $\Sigma W3*X3$. The processor cores CORE0 to CORE3 write the convolution operation results to the respective individual memories IMEM0 to IMEM3. The memory control circuits MAU0 to MAU1 control the images X0 to X3, which are read from the individual memories IMEM0 to IMEM3, to be transferred to second memory banks B#b (#=0 to 3) of the respective shared memories SMEM1 to SMEM3, and SMEM0 belonging to the second adjacent processor cores. As a result, the image X3 is stored in the shared memory SMEM0, the image X0 is stored in the shared memory SMEM1, the image X1 is stored in the shared memory SMEM2, and the image X2 is stored in the shared memory SMEM3.

In the time T2 as a second operation cycle, the processor cores CORE0 to CORE3 read the respective images X3, X0 to X2 from the second memory banks B#b of the shared memories SMEM0 to SMEM3, which belong to the respective processor cores CORE0 to CORE3, and perform the convolution operations $\Sigma W3*X3$, $\Sigma W0*X0$, $\Sigma W1*X1$, $\Sigma W2*X2$ by using the respective coefficient filter groups. The processor cores CORE0 to CORE3 add the convolution operation results to the previous convolution operation results obtained in the time T1 and written to the respective individual memories IMEM0 to IMEM3 and write the convolution operation results to the individual memories IMEM0 to IMEM3; in other words, the processor cores CORE0 to CORE3 perform read-modify-write. The memory control circuits MAU0 to MAU1 subsequently control the images X3, X0 to X2, which are read from the second memory banks B#b of the individual memories IMEM0 to IMEM3, to be transferred to first memory banks B#a of the respective shared memories SMEM1 to SMEM3, and SMEM0 belonging to the second adjacent processor cores. As a result, the image X2 is stored in the shared memory SMEM0, the image X3 is stored in the shared memory SMEM1, the image X0 is stored in the shared memory SMEM2, and the image X1 is stored in the shared memory SMEM3.

In the times T3 and T4 as third and fourth operation cycles, similarly to the second operation cycle, the processor cores CORE0 to CORE3 read the images from the shared memories SMEM0 to SMEM3, which belong to the respective processor cores CORE0 to CORE3, perform the convolution operations by using the respective coefficient filter groups, add the operation results to the previous operation results in the preceding operation cycle, and stores the operation results in the individual memories IMEM0 to IMEM3. The memory control circuits MAU0 to MAU1 control the images read from the shared memories SMEM0 to SMEM3 to be transferred respectively to the shared memories SMEM1 to SMEM3, and SMEM0 belonging to the second adjacent processor cores.

The first memory banks B#a and the second memory banks B#b in the shared memories SMEM0 to SMEM3 are switched between a write destination of transfer data and a read destination of an image in every operation cycle. This change is performed in accordance with transfer selection information or read selection information that is set in the selectors for the shared memories by the control core.

In such a manner, the four images X0 to X3 that the four processor cores target for operation are transferred to the adjacent shared memories in each of the operation cycles T1 to T4, thereby circulating among the four shared memory synchronously with the operation cycles. As a result, the four images X0 to X3 are transferred only at the first time from the internal high-speed memory I_MEM to the four individual memories IMEM0 to IMEM3 under the control of the direct memory access control circuit DMA, and in the following operation cycles, transferred and circulated among the four shared memories. The transfer among the shared memories does not involve the access to the internal bus, resulting in efficient processing and saving power.

Details of GPU Configuration

Figure 9:
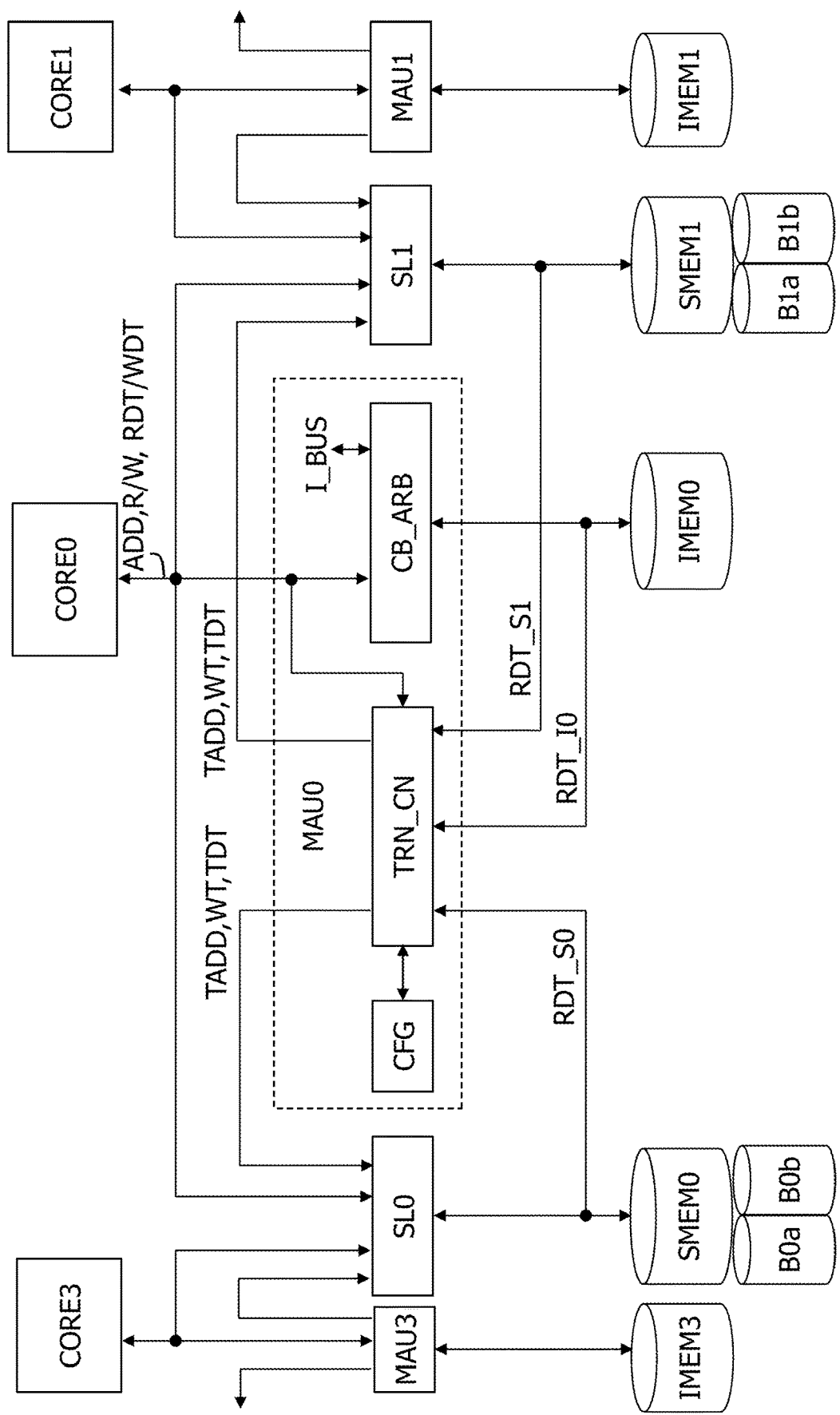
FIG. 9 illustrates a configuration among the processor cores, and individual memories and shared memories in the graphic processor circuit.

FIG. 9 illustrates a configuration among the processor cores, and the individual memories and the shared memories in the GPU. While centered around the processor core CORE0, FIG. 9 illustrates the first adjacent processor core CORE3 in the first direction and the second adjacent processor core CORE1 in the second direction opposite to the first direction. The individual memory IMEM0, the shared memory SMEM0, the memory control circuit MAU0, the selector SL0, which all belong to the processor core CORE0, are described below.

Between the processor core CORE0 and the individual memory IMEM0 belonging to the processor core CORE0, the memory control circuit MAU0 is provided to output an access request from the processor core to the individual memory IMEM0. Between the processor core CORE0 and the shared memory SMEM0 belonging to the processor core CORE0, the selector SL0 is also provided. The shared memory SMEM0 includes, for example, the two memory banks B0a and B0b, which individually perform processing in accordance with the access requests. Thus, it is possible that, while one of the memory banks is a read destination of an image, the other of the memory banks is a write destination of transfer data.

The memory control circuit MAU0 includes a core-bus arbitration circuit CB_ARB that, when an access request from the processor core CORE0 and an access request from the internal bus I_BUS conflict with each other, arbitrates between the processor core CORE0 and the internal bus I_BUS and outputs one access request to the individual memory IMEM0. The core-bus arbitration circuit CB_ARB performs arbitration, for example, such that the access request from the internal bus I_BUS takes priority. Otherwise, the arbitration may be performed such that one of access requests takes priority in accordance with a set value.

The processor core CORE0 performs an access request to the individual memory IMEM0 belonging to the processor core CORE0 via the memory control circuit MAU0. The processor core CORE0 also performs an access request to the shared memory SMEM0 belonging to the processor core CORE0 via the selector SL0 and an access request to the shared memory SEME1 belonging to the second adjacent processor core CORE1 via the selector SL1.

Discrete logical addresses in a memory space are assigned to the shared memories SMEM0 to SMEM3 and the individual memories IMEM0 to IMEM3. For example, contiguous addresses are assigned to the two memory banks B0a and B0b of the shared memory SMEM0 and the individual memory IMEM0 that both belong to the processor core CORE0. Accordingly, contiguous addresses are assigned to the shared memories and the individual memories that belong to each of the four processor cores. As a result, it is possible for the processor core CORE0 to select data in the individual memory IMEM0 and the shared memory SMEM0, which belong to the processor core CORE0, and the shared memory SMEM1, which belongs to the second adjacent processor core CORE1, by using unique addresses.

The selector SL0 is provided for the shared memory SMEM0. The selector SL0 selects one of four inputs in accordance with selection information set by the control core C_CORE.

For example, access selection information (the read selection information) is set in the selector SL0 by the control core C_CORE. In accordance with this setting, the selector SL0 selects one of an access request from the processor core CORE0 and an access request from the first adjacent processor core CORE3 in the first direction and outputs the selected access request to the shared memory SMEM0. The same holds for the other selectors.

Accordingly, in a case where the access selection information for selecting the access request from the processor core CORE0 is set to the selectors SL0 and SL1, when the processor core CORE0 outputs a control signal for transmitting an address ADD and a read/write signal R/W as a form of memory access, the control signal is output to the shared memory SMEM0, the individual memory IMEM0, and the shared memory SMEM1 adjacent in the second direction. As a result, the processor core CORE0 is able to access an specific data area in the memory identified by the address ADD. The processor core CORE0 outputs wright data WDT in a case of a write request, whereas the processor core CORE0 receives read data RDT in a case of a read request.

For example, transfer selection information is set in the selector SL0 by the control core C_CORE. In accordance with this setting, the selector SL0 selects one of a transfer request from the memory control circuit MAU0 belonging to the processor core CORE0 and a transfer request from the memory control circuit MAU3 belonging to the first adjacent processor core CORE3 and outputs the selected transfer request to the shared memory SMEM0. The same holds for the other selectors.

Since the shared memory SMEM0 includes the two memory banks B0a and B0b, the selector SL0 is provided for the both two memory banks and thus performs ¼ selection with respect to each memory bank.

Transfer Operation for Read Data to Shared Memory

Figure 10:
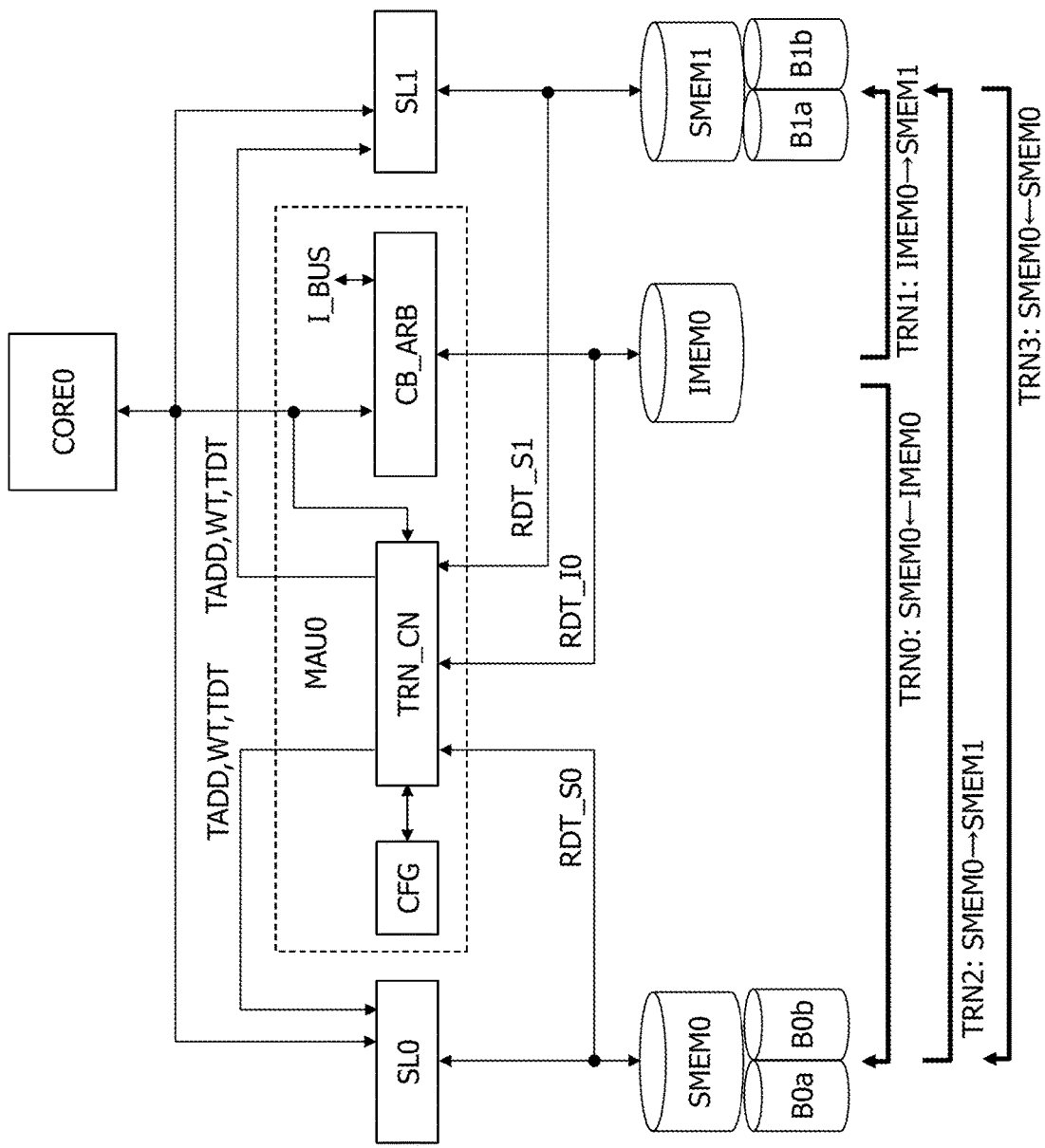
FIG. 10 illustrates transfer operation for read data to a shared memory performed by a memory control circuit.

FIG. 10 illustrates transfer operation for read data to the shared memory performed by the memory control circuit. The memory control circuit MAU0 belonging to the processor core CORE0 includes a transfer control circuit TRN_CN. The transfer control circuit TRN_CN controls read data RDT, which is read from the individual memory IMEM0 or the shared memory SMEM0 belonging to the processor core CORE0, or the shared memory SMEM1 belonging to the second adjacent processor core CORE1, to be transferred to either the shared memories SMEM0 or SMEM1.

When the processor core CORE0 performs a read request to the individual memory IMEM0 to receive the read data RDT_I0 and perform an predetermined operation, the transfer control circuit TRN_CN in the memory control circuit detects the read request and controls the read data RDT_I0 to be transferred to either the two shared memories SMEM0 or SMEM1; in other words, the read data is transferred in either a direction of transfer TRN0 or a direction of transfer TRN1, which are indicated by arrows in FIG. 10. The control core C_CORE sets in a configuration register CFG of the transfer control circuit TRN_CN a specific address from which read data is read and another specific address of a shared memory to which the read data is transferred. The control core C_CORE sets in the selectors SL0 and SL1 the transfer selection information in accordance with transfer destinations.

When the processor core CORE0 performs a read request to the shared memory SMEM0 to receive read data RDT_S0 and perform an predetermined operation, the transfer control circuit TRN_CN detects the read request and controls the read data RDT_S0 to be transferred to the shared memory SMEM1 as the other shared memory; in other words, the read data is transferred in a direction of transfer TRN2, which is indicated by an arrow in FIG. 10. This transfer operation is also controlled in accordance with a set value that is set in the configuration register CFG.

When the processor core CORE0 performs a read request to the shared memory SMEM1 to receive read data RDT_S1 and perform an predetermined operation, the transfer control circuit TRN_CN detects the read request and controls the read data RDT_S1 to be transferred to the shared memory SMEM0 as the other shared memory; in other words, the read data is transferred in a direction of transfer TRN3, which is indicated by an arrow in FIG. 10. This transfer operation is also controlled in accordance with a set value that is set in the configuration register CFG.

Function and Operation of Transfer Control Circuit of Memory Control Circuit

Next, a function and an operation of transfer control circuit are described.

Figure 11:
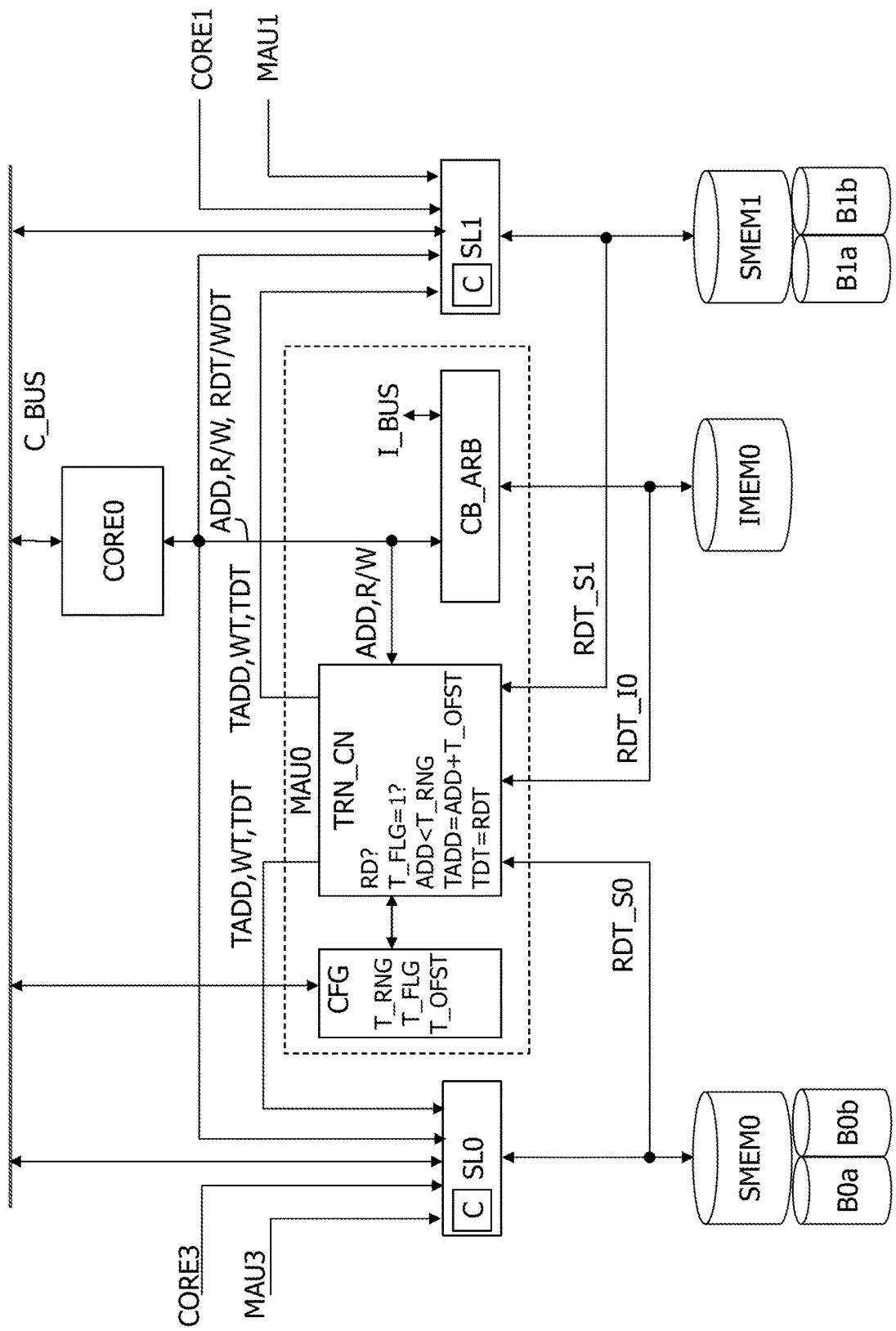
FIG. 11 is an diagram for describing a transfer control circuit and a configuration register.
Figure 12:
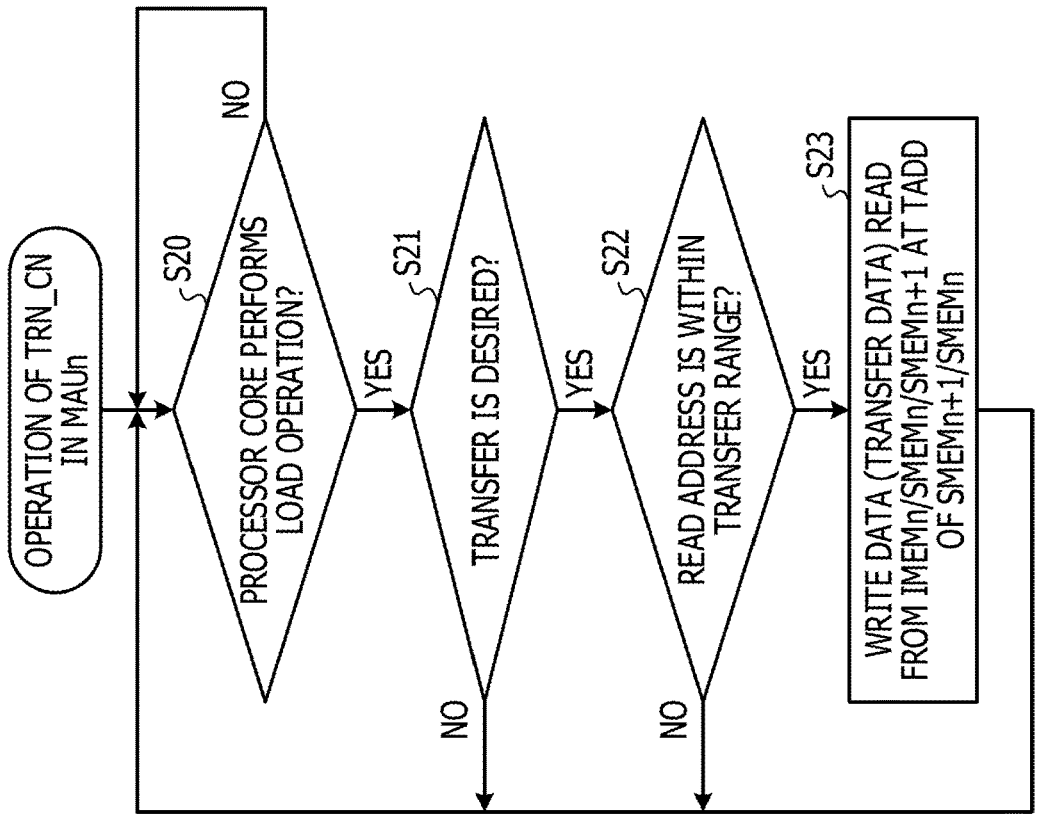
FIG. 12 is a flowchart illustrating operation of the transfer control circuit.

FIG. 11 is an diagram for describing the transfer control circuit TRN_CN and the configuration register CFG. FIG. 12 is a flowchart illustrating the operation of the transfer control circuit. FIG. 12 also illustrates a table indicating set values that are set in the configuration register CFG. A transfer range T_RNG denotes a transfer source address of transfer data. A transfer flag T_FLG determines whether transfer is desired or not. A transfer offset T_OFST is information on a transfer destination address and a transfer destination address is calculated by adding the transfer offset T_OFST to a read address RADD. Accordingly, by setting the transfer offset T_OFST with respect to the transfer range T_RNG as a certain value, a memory bank of a shared memory as a transfer destination is selected.

As illustrated in FIG. 11, the control core C_CORE sets set values respectively in the configuration register CFG for the transfer control circuit TRN_CN and configuration registers C of the selectors SL0 and SL1 via a control bus C_BUS. In the configuration register CFG, the transfer range T_RNG, the transfer flag T_FLG, and the transfer offset T_OFST are set. For example, the access selection information (the read selection information), which is used for selecting an access request from one of the processor cores on both sides of a specific selector, and the transfer selection information, which is used for selecting a transfer request (a write request) from the transfer control circuit TRN_CN of one of the memory control circuits on both sides of the specific selector, are set in the configuration registers C of the selectors SL0 and SL1. As described above, the shared memories SMEM0 and SMEM1 each include at least two memory banks, and it is possible to set selection information individually for the memory banks in each of the selectors SL0 and SL1.

As illustrated in FIGS. 11 and 12, the transfer control circuit TRN_CN in the memory control circuit MAU observes the read/write signal R/W for transmitting an access request from the processor core. In a case where the transfer control circuit TRN_CN detects a read request performed by an load instruction (YES in S20), the transfer control circuit TRN_CN determines whether the transfer flag T_FLG denotes that transfer is desired (S21) and determines whether the read address RADD is an address within the transfer range T_RNG (S22). If YES in the both determination, the transfer control circuit TRN_CN calculates a transfer destination address TADD by adding the transfer offset T_OFST to the read address RADD and transfers the read data RDT as transfer data TDT to the transfer destination address TADD (S23).

In this manner, as illustrated in FIG. 11, the transfer control circuit TRN_CN controls the transfer destination address TADD, a write signal WT, and the transfer data TDT to be transferred to the shared memory as the transfer destination via the selector SL and controls the transfer data TDT to be written to the shared memory.

Configuration Set by Control Core and Transfer Operation in Accordance with Configuration Configurations that are set by the control core and operations of the transfer control circuit in the memory control circuit are collectively described as follows. Also in the following description, the individual memory and the shared memory corresponding to the processor core CORE0 are denoted by reference characters in parentheses.

Firstly, with respect to each of the transfer control circuits in the multiple memory control circuits:

(1) the control core C_CORE sets the transfer source address T_RNG of one of the individual memory (IMEM0), the shared memory (SMEM0), and the shared memory (SMEM1) belonging to the second adjacent processor core (CORE1) adjacent in the second direction, which stores the read data RDT to be transferred between the processor cores;

(2) the control core C_CORE also sets the transfer destination address information T_OFST of either the shared memory (SMEM0) or the shared memory (SMEM1) belonging to the second adjacent processor core (CORE1); and (3) in a case where the control core C_CORE sets the transfer selection information in multiple selectors (SL0 and SL1), when the read addresses RADD of the read requests from the multiple processor cores are identical to the transfer source addresses T_RNG, the transfer control circuits of the multiple memory control circuits control the read data RDT, which is read from any one of the individual memory (IMEM0), the shared memory (SMEM0), and the shared memory (SMEM1) belonging to the second adjacent processor core (CORE1), to be transferred as the transfer data TDT to one of the shared memory (SMEM0) and the shared memory (SMEM1) belonging to the second adjacent processor core (CORE1) that corresponds to the transfer destination address information T_OFST.

Secondly, in a case where the control core C_CORE sets the read selection information in the multiple selectors (SL0 and SL1), the read data in the multiple shared memories (SMEM0 and SMEM1) are read via the selectors (SL0 and SL1), in which the read selection information is set, by either the processor core (CORE0) to which the shared memory belongs or the first adjacent processor core (CORE3).

Overall Operations of Control Core, Processor Core, Memory Control Circuit, and Selector Next, in the present embodiment, operations of the control core C_CORE, operations of the four processor cores CORE0 to CORE3, operations of the four memory control circuit MAU0 to MAU3 (the transfer control circuits TNS_CN) and the selectors SL0 to SL3 are collectively described.

Figure 13:
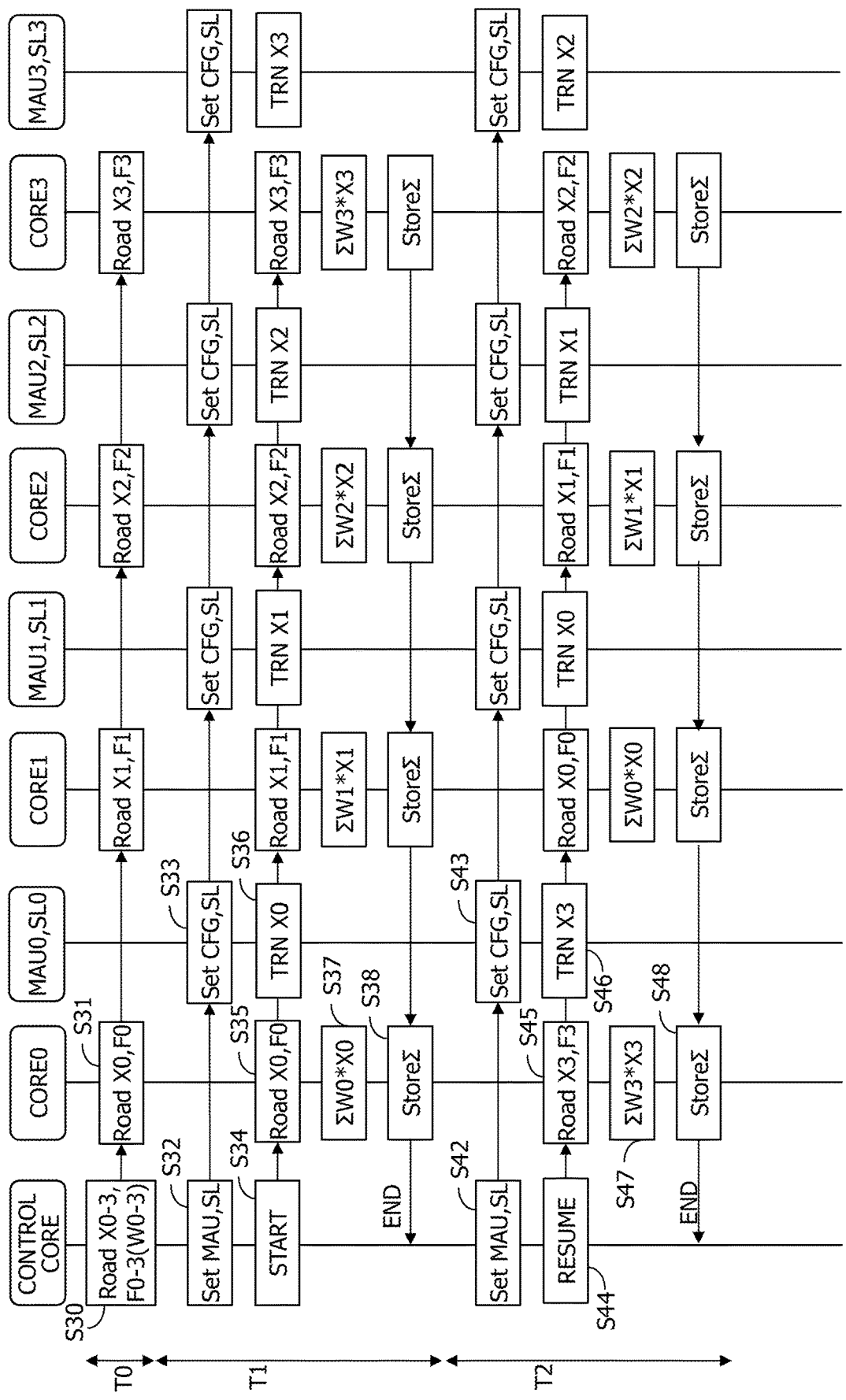
FIG. 13 is a sequence diagram illustrating operations in times in a sequence illustrated in FIG. 8.
Figure 14:
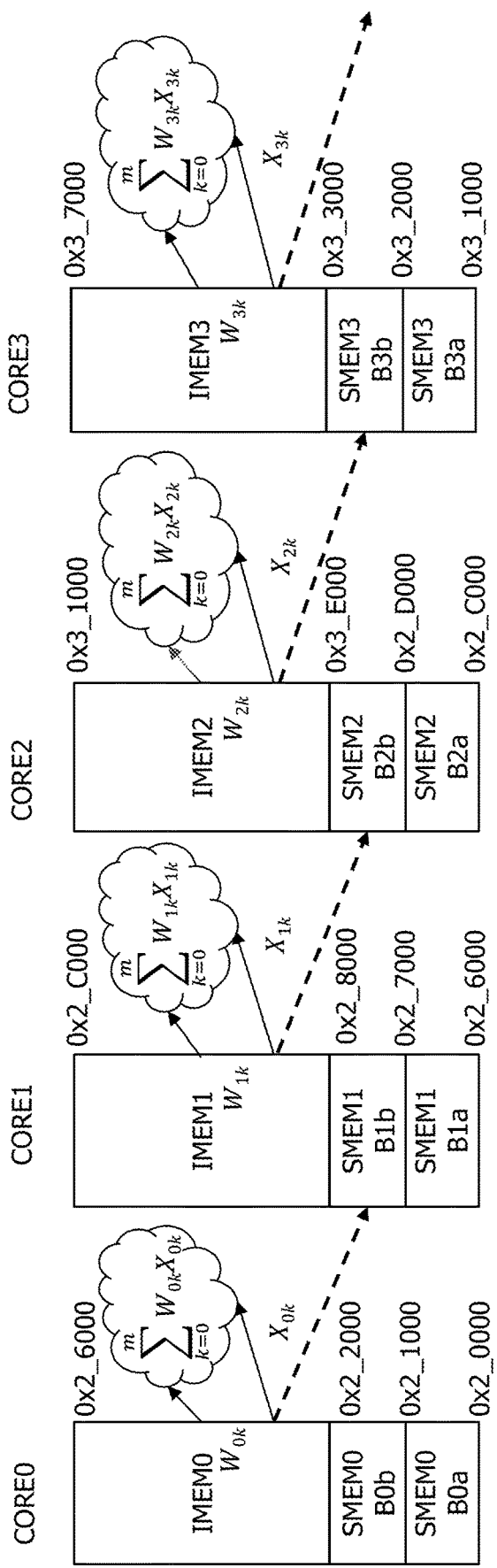
FIG. 14 illustrates data reading operation and read data transfer operation in relation to two memory banks of the shared memories and the individual memories that belong to the four respective processor cores.
Figure 15:
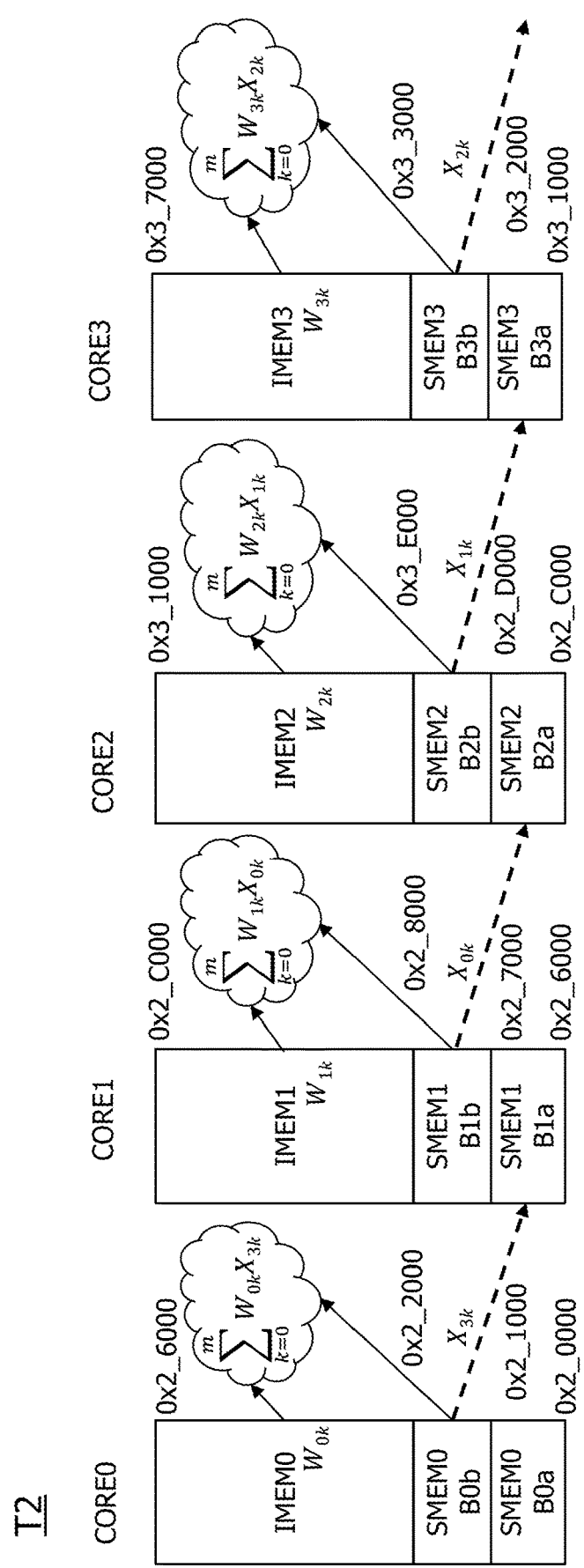
FIG. 15 illustrates data the reading operation and the read data transfer operation in relation to the two memory banks of the shared memories and the individual memories that belong to the four respective processor cores.
Figure 16:
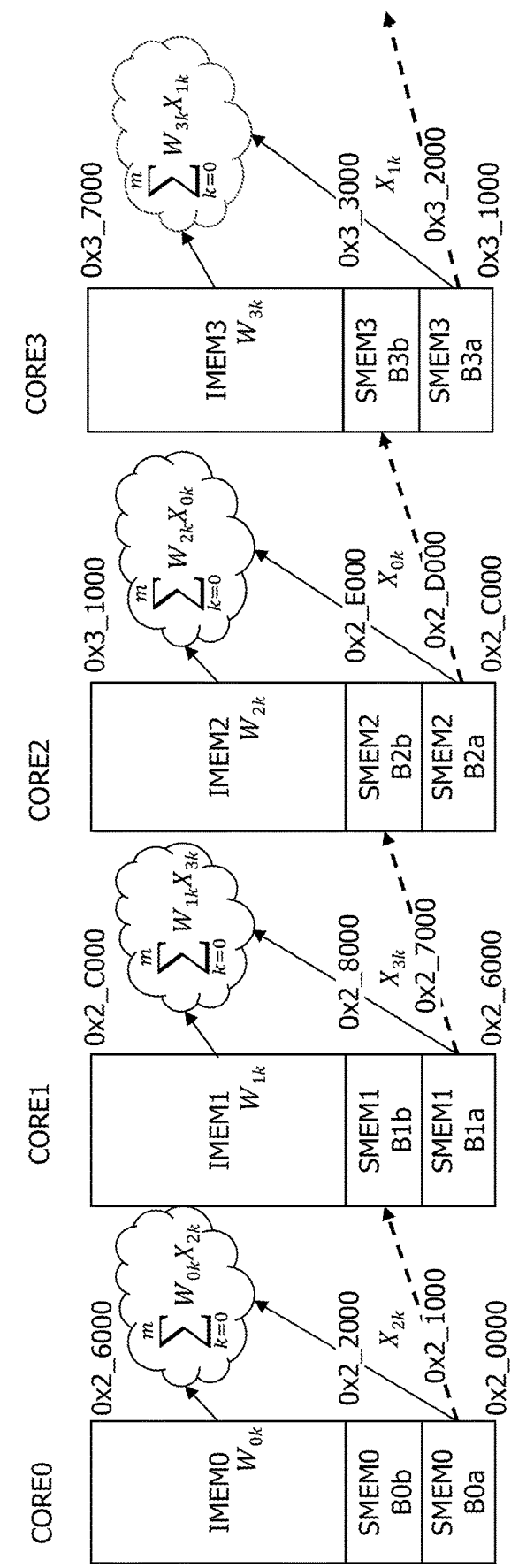
FIG. 16 illustrates the data reading operation and the read data transfer operation in relation to the two memory banks of the shared memories and the individual memories that belong to the four respective processor cores.

FIG. 13 is a sequence diagram illustrating operations in the times T0, T1, and T2 in the sequence illustrated in FIG. 8. FIGS. 14, 15, and 16 illustrates data reading operation and transfer operation in relation to the two memory banks B#a and B#b of the shared memories SMEM# and the individual memories IMEM# that belong to the four respective processor cores. FIG. 14 corresponds to the time T1, FIG. 15 corresponds to the time T2, and FIG. 16 corresponds to the time T3.

Time T0

In the time T0, the control core C_CORE instructs the four processor cores CORE0 to CORE3 to load from the internal memory I_MEM the respective images X0 to X3 and four respective filter groups F0 to F3 into the individual memories IMEM0 to IMEM3 belonging to the four respective processor cores CORE0 to CORE3 (S30). In response to the instruction, the processor cores CORE0 to CORE3 loads the respective images X0 to X3 and the four respective filter groups F0 to F3 into the individual memories (S31).

Time T1

Next, in the time T1, the control core C_CORE sets the configuration for data transfer in the memory control circuit MAU0 to MAU3 and the selector SL0 to SL3 that belong to the four respective processor cores (S32). In response to this, in each of the memory control circuits, the transfer range (the transfer source address), the transfer flag, the transfer offset (the transfer destination address information), which are described above, are set in the configuration register CFG for the transfer control circuit (S33). In addition, the transfer selection information is set in the selectors. In the time T1, the transfer range is set as an address in the individual memory and the transfer selection information is set as the memory control circuit (the transfer control circuit) side that belongs to the second adjacent processor core adjacent to the processor core to which the selector SL# belongs.

Subsequently, the control core C_CORE instructs the four processor cores CORE0 to CORE3 to start the convolution operations (S34). In response to the start instruction, the four processor cores load (read) the respective images X0 to X3 and the respective filter groups F0 to F3 from the individual memories belonging to the respective four processor cores. At the same time, the transfer control circuits of the memory control circuits each detect an read operation, detect that the transfer range in the configuration register CFG is identical to the read address and that the transfer flag denotes that transfer is desired, calculate the transfer destination address TADD, and control each of the images X0 to X3 as read data to be output together with the write signal WT to the shared memory (the memory bank B#b) that belongs to the second adjacent processor core and that is at the transfer destination address TADD. In this manner, the read data is transferred to the shared memory (S36).

Subsequently, the processor cores perform the convolution operations for the respective read images X0 to X3 and the respective coefficients W0 to W1 of the read filter groups F0 to F3 (S37) and stores the operation results in the individual memories belonging to the respective processor cores (S38). The processor cores then each transmit an end signal END to the control core C_CORE. The end signal may be transmitted to the control core at both the timing of ending transfer and the timing of ending the operation. When the operation processing times of the respective processor cores differ from one another, the processor cores do not necessarily perform the operation processing synchronously.

FIG. 14 illustrates, with respect to each of the processor cores, addresses of the two memory banks B#a and B#b of the shared memory SMEM# belonging to a specific processor core and an address of the individual memory IMEM# and also illustrates the read operation (a solid-line arrow) of the image X and the filter coefficient W in the time T1 and the transfer operation (a dashed-line arrow) of the image X to the memory bank B#b of the adjacent shared memory SMEM#. The start address of the memory bank B0a of the shared memory SMEM0 belonging to the processor core CORE0 is 0x2_0000, the start address of the memory bank B0b is 0x2_1000, the start address of the individual memory IMEM0 is 0x2_2000, and the end address of the individual memory IMEM0 is 0x2_6000. The addresses relating to the processor cores CORE1 to CORE3 are similarly expressed.

The processor cores each read the image X from the own individual memory and the corresponding transfer control circuit of the memory control circuit simultaneously controls the read image X to be transferred to the memory bank B#b of the shared memory of the second adjacent processor core.

Time T2

Next, in the time T2, the control core C_CORE sets the configuration similar to that of the time T1 in the configuration registers CFG of the memory control circuits (S42 and S43). However, since the transfer destination is, unlike the configuration in the time T1, changed to the memory bank B#a of the shared memory, the transfer offset as the transfer destination address information is a value corresponding to the memory bank B#a. In addition, the control core sets the read selection information and the transfer selection information in the selectors SL# (S42 and S43). In this manner, the processor cores are each able to read the subsequent image from the shared memory belonging to the specific processor core and the transfer control circuit is able to control the image to be transferred to the shared memory belonging to the second adjacent processor core.

The control core performs an instruction for resuming the operation (S44). The processor cores each load the image and the filter coefficient therein (S45), perform the convolution operation (S47), add the operation result in the time T2 to the previous operation result in the time T1 that is read from the individual memory, and write back the operation result to the individual memory (the read-modify-write operation) (S48). The transfer control circuits of the memory control circuits each control the image that the processor core is to load therein to be transferred to the shared memory (S48). After completing the convolution operation and writing back the operation result in the individual memory, the processor cores each transmit an end notification END to the control core.

As illustrated in FIG. 15, the processor cores each read the image X from the memory bank B#b of the own shared memory and the corresponding transfer control circuit of the memory control circuit simultaneously controls the read image X to be transferred to the memory bank B#a of the shared memory of the second adjacent processor core.

Times T3 and T4

The operations in the times T3 and T4 are the same as the operations described above. FIG. 16 illustrates the operation in the time T3. The processor cores each read the image X from the memory bank B#a of the own shared memory and the corresponding transfer control circuit of the memory control circuit simultaneously controls the image X to be transferred to the memory bank B#b of the shared memory of the second adjacent processor core. The operation in the time T4 is the same as in FIG. 15.

As illustrated in FIGS. 14, 15, and 16, the four images X0 to X3 are transferred among the shared memories belonging to the four respective processor cores in each of the operation cycles T1 to T4 and circulated among the shared memories.

Second Embodiment

Figure 17:
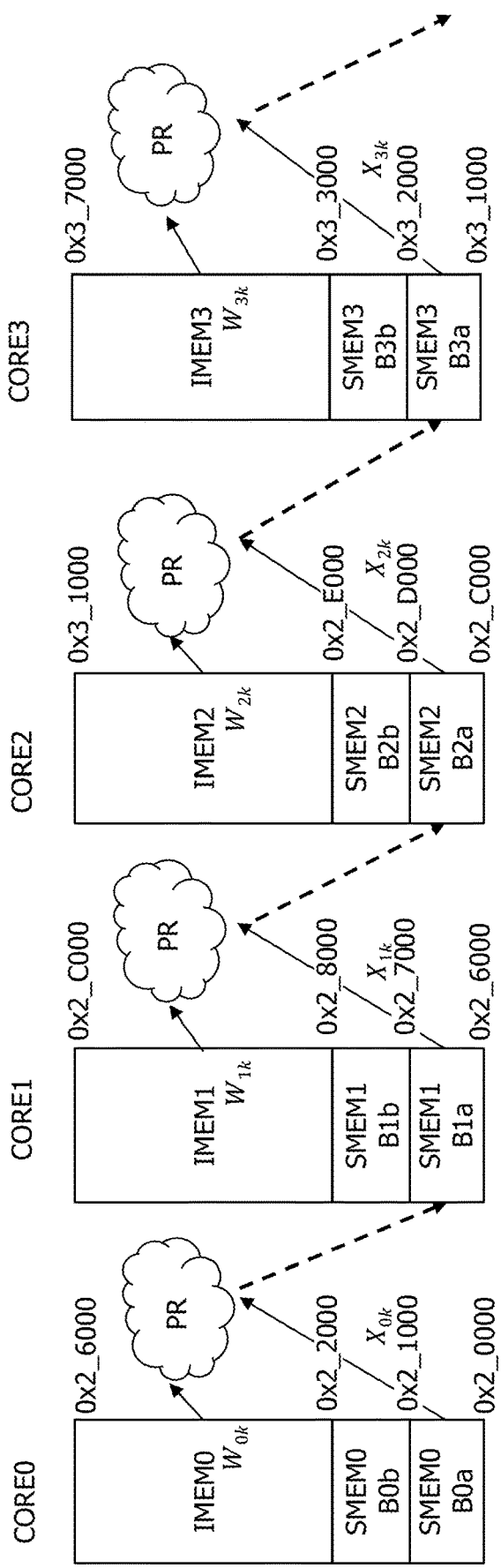
FIG. 17 illustrates operation of a processor circuit according to a second embodiment.

FIG. 17 illustrates an operation of a processor circuit according to a second embodiment. In the operation illustrated in FIG. 17, the processor core CORE0 reads the coefficient W from the individual memory IMEM0 and the image X from the memory bank B0a of the shared memory SMEM0 and performs predetermined processing PR such as the convolution operation. The processor core CORE0 then transfers the processing result to the memory bank B1a of the shared memory SMEM1 belonging to the adjacent processor core CORE1.

Next, the processor core CORE1 reads the coefficient W from the individual memory IMEM1 and the image X as the operation result of the processor core CORE0 from the memory bank B1a of the shared memory SMEM1 and performs the predetermined processing PR such as the convolution operation. The processor core CORE1 then transfers the processing result to the memory bank B2a of the shared memory SMEM2 belonging to the adjacent processor core CORE2.

Subsequently, the processor core CORE2 reads the coefficient W from the individual memory IMEM2 and the image X as the operation result of the processor core CORE1 from the memory bank B2a of the shared memory SMEM2 and performs the predetermined processing PR such as the convolution operation. The processor core CORE2 then transfers the processing result to the memory bank B3a of the shared memory SMEM3 belonging to the adjacent processor core CORE3.

Finally, the processor core CORE3 reads the coefficient W from the individual memory IMEM3 and the image X as the operation result of the processor core CORE2 from the memory bank B3a of the shared memory SMEM3 and performs the predetermined processing PR such as the convolution operation. The processor core CORE3 then transfers the processing result to the memory bank B0a of the shared memory SMEM0 belonging to the adjacent processor core CORE0.

By performing the operations described above, the four processor cores transfer the operation results among the processor cores, and therefore it is possible to considerably reduce the processing for reading the operation results from the internal memory I_MEM.

As described above, in the present embodiment, the shared memory is provided to the processor core in addition to the individual memory, and when the processor core reads data from the individual memory and the shared memory and performs a predetermined operation, the processor core simultaneously transfers the read data to the shared memory belonging thereto or the shared memory belonging to the adjacent processor core. The adjacent processor core then reads the data transferred to the shared memory and performs a predetermined operation. The access operation to the shared memory performed by the processor core and the transfer operation for the read data to the shared memory are performed in accordance with control values set by the control core.

As described above, the data transfer among the processor cores is performed by using control values that are set by the processing core and performing, in accordance with the control values, a transfer request based on an address and a read/write signal that are output by the control core, and therefore, the data transfer may achieve less control overhead.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor circuit comprising:
   multiple processor cores;
   multiple individual memories, each of the multiple individual memories being associated with one of the multiple processor cores and being configured to be accessed from the associated one of the multiple processor cores;
   multiple shared memories, each of the multiple shared memories being associated with a first processor core, the first processor core being any one of the multiple processor cores, each of the multiple shared memories being configured to be accessed from either the first processor core or a first adjacent processor core, the first adjacent processor core being one of the multiple processor cores and being adjacent to the first processor core in a first direction among the multiple processor cores;
   multiple memory control circuits, each of the multiple memory control circuits being provided between the first processor core and an associated individual memory of the multiple individual memories and being configured to output a read request from the first processor core to the associated individual memory belonging to the first processor core;
   multiple selectors, each of the multiple selectors being associated with one of the multiple shared memories and being configured to select a read request from one of the first processor core, to which the associated one of the multiple shared memories belong, and the first adjacent processor core, output the selected read request to the associated one of the multiple shared memories, select a transfer request from one of a specific memory control circuit of the multiple memory control circuits and another memory control circuit of the multiple memory circuits belonging to a second adjacent processor core adjacent to the specific memory control circuit in a second direction, and output the selected transfer request to the associated one of the multiple shared memories; and
   a control core configured to control the multiple processor cores;

wherein, in a case where the control core sets, in each of the multiple memory control circuits, a transfer source address of one of the multiple individual memories and the multiple shared memories that store transfer data to be transferred among the multiple processor cores and a transfer destination address of one of the multiple shared memories to which the transfer data is to be transferred and also sets transfer selection information in each of the multiple selectors, with respect to each of the multiple memory control circuits, when an address of the read request from the first processor, to which a specific memory control circuit belongs, is identical to the transfer source address, the specific memory control circuit controls the transfer data in accordance with the read request to be transferred to the transfer destination address via a specific selector of the multiple selectors in which the transfer selection information is set, wherein, in a case where the control core sets read selection information in each of the multiple selectors, with respect to each of the multiple shared memories, read data is read by one of the first processor core, to which an associated shared memory of the multiple shared memories belongs, and the first adjacent processor core from the associated shared memory via a specific selector of the multiple selectors in which the read selection information is set.

2. The processor circuit according to claim 1, wherein the transfer source address is an address corresponding to particular one of the associated individual memory, the associated shared memory, and another shared memory of the multiple shared memories belonging to the second adjacent processor core adjacent in the second direction, the particular one storing the transfer data, and the transfer destination address is transfer destination address information on one of the associated shared memory and the other shared memory belonging to the second adjacent processor core.

3. The processor circuit according to claim 2, wherein with respect to each of the multiple memory control circuits, when the address of the read request from the first processor, to which a specific memory control circuit belongs, is identical to the transfer source address, the specific multiple memory control circuit controls the read data, which is read from one of the associated individual memory, the associated shared memory, and the other shared memory belonging to the second adjacent processor core, to be transferred as the transfer data to particular one of the associated shared memory and the other shared memory belonging to the second adjacent processor core, the particular one corresponding to the transfer destination address.

4. The processor circuit according to claim 1, wherein each of the multiple shared memories includes a first memory bank and a second memory bank, in a case where the control core sets, in each of the multiple selectors, the transfer selection information for the first memory bank and the read selection information for the second memory bank, the transfer data is transferred to the first memory bank and the read data is read from the second memory bank, and in a case where the control core sets the transfer selection information for the second memory bank and the read selection information for the first memory bank, the transfer data is transferred to the second memory bank and the read data is read from the first memory bank.

5. The processor circuit according to claim 1, wherein
after the control core sets the read selection information and the transfer selection information in a specific selector of the multiple selectors, the first processor core performs the read request and performs an operation for the read data, and a corresponding memory control circuit of the multiple memory control circuits controls the read data to be transferred as the transfer data via the specific selector to a specific shared memory of the multiple shared memories, and after the first processor core ends the operation, the control core sets again the read selection information and the transfer selection information in the specific selector, the first processor core performs again the read request and performs an operation for the read data, and the corresponding memory control circuit controls again the read data to be transferred as the transfer data via the specific selector to the specific shared memory.

6. The processor circuit according to claim 5, wherein
in each operation cycle of the multiple processor cores, the transfer data stored in the multiple individual memories is transferred to the multiple respective shared memories that each belong to an adjacent processing core of the multiple processing cores.

7. The processor circuit according to claim 5, wherein
in each operation cycle of the multiple processor cores, the transfer data stored in the multiple individual memories is transferred to the multiple respective shared memories that each belong to an adjacent processing core of the multiple processing cores and the transfer data is circulated among the multiple shared memories.

8. The processor circuit according to claim 5, wherein
operation target data is written to the multiple individual memories belonging to the multiple respective processor cores, the multiple processor cores individually read the operation target data from the multiple respective individual memories belonging to the multiple processor cores and perform operations for the operation target data, and the multiple memory control circuits belonging to the multiple processor cores individually control the read data to be transferred to the multiple respective shared memories, and in each operation cycle of the multiple processor cores, the transfer data is transferred to the multiple respective shared memories that each belong to an adjacent processing core of the multiple processing cores and the transfer data is circulated among the multiple shared memories.

9. An information processing apparatus comprising:
a main memory; and
a processor circuit accessible to the main memory,
wherein the processor circuit includes
multiple processor cores,
multiple individual memories, each of the multiple individual memories being associated with one of the multiple processor cores and being configured to be accessed from the associated one of the multiple processor cores,
multiple shared memories, each of the multiple shared memories being associated with a first processor core, the first processor core being any one of the multiple processor cores, each of the multiple shared memories being configured to be accessed from either the first processor core or a first adjacent processor core, the first adjacent processor core being one of the multiple processor cores and being adjacent to the first processor core in a first direction among the multiple processor cores, multiple memory control circuits, each of the multiple memory control circuits being provided between the first processor core and an associated individual memory of the multiple individual memories and being configured to output a read request from the first processor core to the associated individual memory belonging to the first processor core, multiple selectors, each of the multiple selectors being associated with one of the multiple shared memories and being configured to select a read request from one of the first processor core, to which the associated one of the multiple shared memories belong, and the first adjacent processor core, output the selected read request to the associated one of the multiple shared memories, select a transfer request from one of a specific memory control circuit of the multiple memory control circuits and another memory control circuit of the multiple memory circuits belonging to a second adjacent processor core adjacent to the specific memory control circuit in a second direction, and output the selected transfer request to the associated one of the multiple shared memories, and a control core configured to control the multiple processor cores, wherein, in a case where the control core sets, in each of the multiple memory control circuits, a transfer source address of one of the multiple individual memories and the multiple shared memories that store transfer data to be transferred among the multiple processor cores and a transfer destination address of any of the multiple shared memories to which the transfer data is to be transferred and also sets transfer selection information in each of the multiple selectors, with respect to each of the multiple memory control circuits, when an address of the read request from the first processor, to which a specific memory control circuit belongs, is identical to the transfer source address, the specific memory control circuit controls the transfer data in accordance with the read request to be transferred to the transfer destination address via a specific selector of the multiple selectors in which the transfer selection information is set, and wherein, in a case where the control core sets read selection information in each of the multiple selectors, with respect to each of the multiple shared memories, read data is read by one of the first processor core, to which an associated shared memory of the multiple shared memories belongs, and the first adjacent processor core from the associated shared memory via a specific selector of the multiple selectors in which the read selection information is set.

10. An operation method of a processor circuit,
wherein the processor circuit includes
multiple processor cores,
multiple individual memories, each of the multiple individual memories being associated with one of the multiple processor cores and being configured to be accessed from the associated one of the multiple processor cores,
multiple shared memories, each of the multiple shared memories being associated with a first processor core, the first processor core being any one of the multiple processor cores, each of the multiple shared memories being configured to be accessed from either the first processor core or a first adjacent processor core, and the first adjacent processor core being one of the multiple processor cores and being adjacent to the first processor core in a first direction among the multiple processor cores, multiple memory control circuits, each of the multiple memory control circuits being provided between the first processor core and an associated individual memory of the multiple individual memories and being configured to output a read request from the first processor core to the associated individual memory belonging to the first processor core, multiple selectors, each of the multiple selectors being associated with one of the multiple shared memories and being configured to select a read request from one of the first processor core, to which the associated one of the multiple shared memories belong, and the first adjacent processor core, output the selected read request to the associated one of the multiple shared memories, select a transfer request from one of a specific memory control circuit of the multiple memory control circuits and another memory control circuit of the multiple memory circuits belonging to a second adjacent processor core adjacent to the specific memory control circuit in a second direction, and output the selected transfer request to the associated one of the multiple shared memories, and a control core configured to control the multiple processor cores, wherein the control core sets, in each of the multiple memory control circuits, a transfer source address of one of the multiple individual memories and the multiple shared memories that store transfer data to be transferred among the multiple processor cores and a transfer destination address of one of the multiple shared memories to which the transfer data is to be transferred and also sets transfer selection information in each of the multiple selectors, wherein, with respect to each of the multiple memory control circuits, when an address of the read request from the first processor, to which a specific memory control circuit belongs, is identical to the transfer source address, the specific memory control circuit controls the transfer data in accordance with the read request to be transferred to the transfer destination address via a specific selector of the multiple selectors in which the transfer selection information is set, wherein the control core sets read selection information in each of the multiple selectors, and wherein, with respect to each of the multiple shared memories, read data is read by one of the first processor core, to which an associated shared memory of the multiple shared memories belongs, and the first adjacent processor core from the associated shared memory via a specific selector of the multiple selectors in which the read selection information is set.

* * * * *